United States Patent [19]

Mitsuhashi

[11] Patent Number: 5,313,347
[45] Date of Patent: May 17, 1994

[54] ROTATING MAGNETIC HEAD FOR A MAGNETIC RECORDING REPRODUCTION SYSTEM

[75] Inventor: Yasuo Mitsuhashi, Nagaokakyo, Japan

[73] Assignee: Mitsubishi Denki Kabushiki Kaisha, Tokyo, Japan

[21] Appl. No.: 638,764

[22] Filed: Jan. 8, 1991

[30] Foreign Application Priority Data

Jan. 12, 1990 [JP] Japan .................................. 2-5186
Jan. 19, 1990 [JP] Japan ................................. 2-11499

[51] Int. Cl.$^5$ ........................ G11B 5/596; G11B 21/02; G11B 5/56; G11B 7/00
[52] U.S. Cl. .................. 360/77.16; 360/77.03; 360/109; 369/44.11; 369/120
[58] Field of Search .............. 360/77.01, 77.02, 77.03, 360/77.04, 77.16

[56] References Cited

U.S. PATENT DOCUMENTS

| | | | |
|---|---|---|---|
| 4,446,497 | 5/1984 | Hirayama | 360/77.16 |
| 4,564,876 | 1/1986 | Takahashi et al. | 360/77.16 |
| 4,566,045 | 1/1986 | Weissensteiner | 360/77 |
| 4,710,828 | 12/1987 | Suizer | 360/75 |
| 4,745,496 | 5/1988 | O'Gwynn | 360/77 |
| 4,811,316 | 5/1989 | Hosoya | 360/77.03 |
| 4,858,040 | 8/1989 | Hazebrouck | 360/77.02 |
| 4,901,298 | 2/1990 | Masaki | 360/78.04 |
| 4,958,245 | 9/1990 | Roth et al. | 360/77.03 |

FOREIGN PATENT DOCUMENTS

| | | |
|---|---|---|
| 0145331 | 6/1985 | European Pat. Off. . |
| 0150828 | 8/1985 | European Pat. Off. . |
| 0168269 | 1/1986 | European Pat. Off. . |
| 0193129 | 9/1986 | European Pat. Off. . |
| 3009469 | 9/1980 | Fed. Rep. of Germany . |
| 3515806 | 11/1985 | Fed. Rep. of Germany . |
| 63-67253 | 12/1988 | Japan . |
| 282769 | 11/1989 | Japan . |
| 2209237A | 5/1989 | United Kingdom . |
| 2209238A | 5/1989 | United Kingdom . |
| 2212650A | 7/1989 | United Kingdom . |

*Primary Examiner*—William L. Sikes
*Assistant Examiner*—Trong Phan

[57] ABSTRACT

A rotating magnetic head for a magnetic recording reproduction system. The rotating magnetic head detects the position of the rotating head placed on the periphery of a rotating drum, and perform servo control of the position of the movable head. The detection of the position of the rotating head is realized by an optical, non-contact mechanism or by detecting the difference of the track scanned by fixed heads. The former requires more than one movable heads and the latter requires a fixed head.

20 Claims, 16 Drawing Sheets

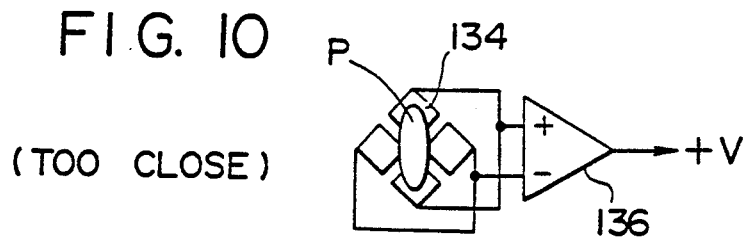
FIG. 10 (TOO CLOSE)
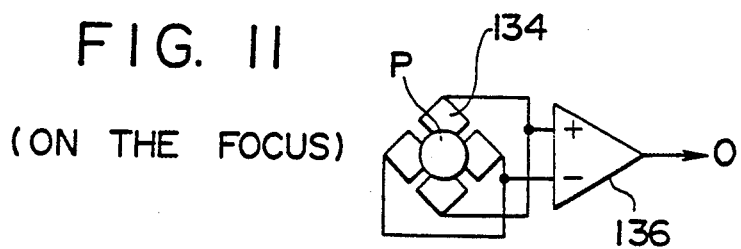
FIG. 11 (ON THE FOCUS)
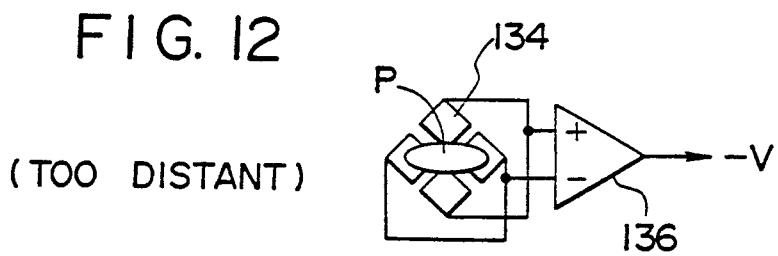
FIG. 12 (TOO DISTANT)
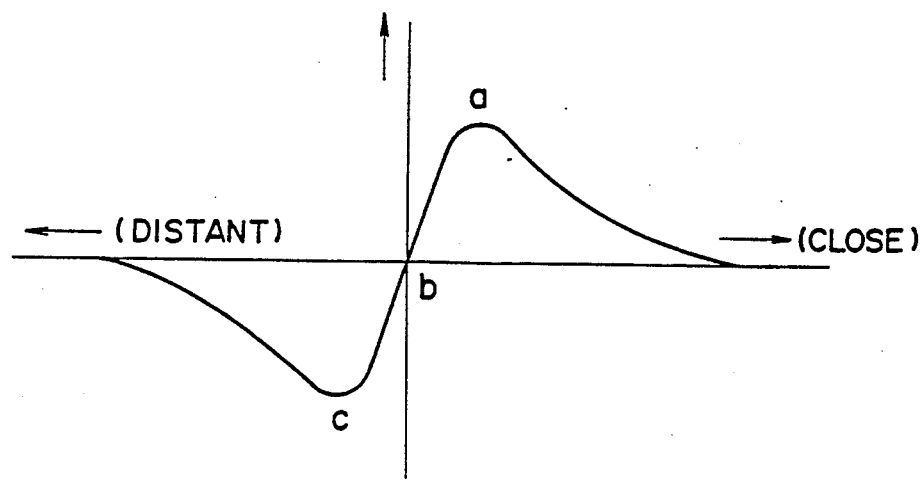
FIG. 13

ROTATING MAGNETIC HEAD FOR A MAGNETIC RECORDING REPRODUCTION SYSTEM

BACKGROUND OF THE INVENTION

1. Field of the Invention:

This invention relates to a rotating magnetic head used in a magnetic recording reproduction system of videotape recorders.

2. Description of the Background Art:

Conventional methods for magnetic recording and reproduction includes automatic scan tracking (AST) and dynamic track following (DTF) and both are used for 1 inch VTR for broadcasting services. In both methods, the head tracks are moved in the width direction of the track in order to reproduce the information on the tracks of a magnetic tape.

FIG. 21 shows a block diagram of conventional rotating magnetic head for a magnetic recording reproduction system. The reproduction system in the diagram has fixed heads 1 and 2, movable heads 3 and 4, bimorph type piezoelectric elements 5 and 6, and a rotating drum 7.

The rotating drum 7 rotates at the speed of 180 rpm. On the periphery of the drum, the fixed heads 1 and 2, and the bimorph type piezoelectric elements 5 and 6 are attached with the same angle distance. At the top of the bimorph type piezoelectric elements 5 and 6, the movable heads 3 and 4 are attached. With this configuration, rotation of the rotating drum 7 causes the rotation of the fixed heads 1 and 2 and the movable heads 3 and 4. When a magnetic tape is rolled round the rotating drum 7, the heads 1 through 4 are rubbed against the magnetic tape one by one. The fixed heads 1 and 2 are usually used for normal reproduction. The movable heads 3 and 4 are used for special reproduction, when the AST or DTF technique is utilized.

FIG. 22 shows actions of the movable heads 3 and 4 at special reproduction. In this figure, the cross-sectional view of the neighborhood of the joint of the rotating drum 7 and the bimorph type piezoelectric element 5 is shown. In contrast with FIG. 21, the bimorph type piezoelectric element 5 and the movable head 3 is placed below the rotating drum 7.

A fixed drum 8 is on the same axis as the rotating drum 7 and is fixed to the covering box of a VTR. A magnetic tape 9 is rolled round the rotating drum 7 and the fixed drum 8 so that one of the fixed heads (1 and 2) or the movable heads (3 and 4) contacts the magnetic tape 9. In FIG. 22, the movable head 3 contacts with the magnetic tape.

The movable head 3 makes contact with a different area of the magnetic tape 9 by bending the bimorph type piezoelectric element 5 as shown by the dotted arrow in FIG. 22. The other movable head 4 has the same structure and performs the same actions.

The bimorph type piezoelectric element 5 bends in vertical directions in FIG. 22 according to a supplied voltage. FIG. 23 is a conceptual diagram of the mechanism. The bimorph type piezoelectric element 5 has piezoelectric elements 5a and 5b with three electrodes 5c, 5d and 5e between the two piezoelectric elements 5a and 5b. In other words, piezoelectric elements and the electrodes are laminated in the following order: 5c, 5a, 5d, 5b and 5e. One endpoint of the bimorph type piezoelectric elements 5 is fixed as described above, and the other endpoint of the bimorph type piezoelectric elements 5 is free and supports the movable head 3.

When alternating current voltage is added to the bimorph type piezoelectric element 5, the free endpoint oscillates due to expansion and contraction of piezoelectric elements 5a and 5b. As shown by arrows inside the piezoelectric elements 5a and 5b in FIG. 23, the piezoelectric elements 5a and 5b are polarized and the direction of polarization (direction of the arrow in the figure) is the same within a piezoelectric element. Moreover, the piezoelectric elements 5a and 5b are polarized and laminated so that the directions of polarization of the two piezoelectric elements coincide with each other.

When alternating current voltage in one direction is added between the electrodes 5d and 5c and voltage in the other direction is added between the electrodes 5d and 5e, one of the piezoelectric elements 5a and 5b expands while the other contracts as shown by the horizontal arrows in the FIG. 23. The expansion and contraction causes bending of the free endpoint the bimorph type piezoelectric element 5 to the contracting piezoelectric element, which results in the shifting of contact area of the movable head 5 and the magnetic tape 9.

FIG. 24 shows track patterns normally recorded on the magnetic tape 9. At normal recording, the recording is performed by fixed heads 1 and 2. The magnetic tape 9 is rolled around and covers approximately 190 degrees of the movable drum 7 and the fixed drum 8. Therefore, the fixed head 1 and the fixed head 2 alternately perform recording. In FIG. 24, A1, A2, . . . are the tracks recorded by the fixed head 1, and B1, B2, . . . are the tracks recorded by the fixed head 2 that has different azimuth angle from the fixed head 1.

At normal reproduction, the fixed heads 1 and 2 scan the tracks A1, B1, A2, B2 . . . in the order and reproduction is performed. The azimuth angle of the head at recording and the azimuth angle of the head at reproduction must be equal.

In FIG. 24, a control track and a linear audio track are indicated by C and D respectively.

Description of a mechanism for speedy searching reproduction of normal recording follows. In the following description, an example of speedy searching reproduction in which the searching speed is five times faster than normal reproduction is used.

Speedy searching is defined as a reproduction in which the information recorded on the magnetic tape 9 is reproduced at higher speed, usually an integer (2, 3, 4 . . . ) times faster, preferably without any noise.

In speedy searching five times faster than normal reproduction, if the voltage is not applied to the bimorph type piezoelectric elements 5 and 6 and the contact area of the movable head 3 to the magnetic tape is fixed, the scanning track of movable head 3 spans, for example, from A1 to A3. Among tracks between A1 and A3, the tracks to be reproduced by the movable head 3 are those tracks recorded with the same azimuth angle as the movable head. If the azimuth angle of the A1, A2, . . . are the same as the azimuth angle of the movable head 3, among A1, B1, A2, B2 and A3 the reproducible tracks are A1, A2, and A3. Therefore, during the scanning of the tracks B1 and B2, the movable head 3 generates noise and noise bars will be displayed on a reproduction screen.

In order to remove the noise in speedy searching, alternating current voltage is added to the bimorph type piezoelectric elements 5 and 6 supporting the movable heads 3 and 4. The alternating current voltage, called driving voltage of the movable head 3 and 4, makes the movable head 3 scan L2, which is identical to the track A1, and not L1. Specifically, it is a saw-tooth-wave like voltage that deviates the contact area to the magnetic tape of the movable head 3 or 4. The amount of deviation should be four track pitches per field period.

By use of the alternating current voltage the noise in the speedy searching disappears. The movable heads 3 and 4 scan the tracks A1, B3, A6, ..., and noiseless speedy searching is enabled. If the driving voltage of the movable heads 3 and 4 is adjusted to the desired speed, speedy searching at any speed is possible in principle.

In practice, however, a rotating magnetic head having the same structure can not perform noiseless speedy searching if the speed is more than five times faster. This is because the movable heads 3 and 4 can not keep facial contact with the magnetic tape 9. The movable heads 3 and 4 have gaps and precise contact of the neighborhood of the gap to the magnetic tape is required for noiseless reproduction. When the width of the deviation of the movable head 3 and 4 is large, facial contact is disabled, and in more than five time speedy searching reproduction, the noise can not be removed.

On the other hand, in order to simplify the structure of the rotating magnetic head, decreasing the number of heads is quite effective. From this view point, if the movable heads can also perform normal recording/reproduction, the fixed heads can be abandoned.

By simply abandoning the fixed heads, however, good normal recording/reproduction can not be realized. Firstly, when reproducing information recorded by other instruments, the tip of the movable head sometimes has to make oblique contact with the magnetic tape. The contact angle of the movable heads toward the magnetic tape is reflected by C/N of the reproduction signal and oblique contact is a factor of poor C/N. Moreover, in normal recording with the movable heads, the reproduction FM signal can not be detected and the positioning control of the movable heads is very difficult. Fixing a movable head at a designated position is also difficult. These factors make recording in standard format extremely difficult.

The rotating magnetic head in which speedy searching reproduction is performed by positioning control of movable heads has the following problems: (1) more than five times faster reproduction than normal reproduction is impossible; and (2) normal recording/reproduction can not be properly realized.

A type of VTR, for example the one known as VHS-HiFi, employs multi-layer recording that records voices and pictures on different layers. FIG. 25 shows an outline structure of a rotating magnetic head, especially the positioning of heads, applied for VHS-HiFi VTR. The instrument records the HiFi audio signals (voices) on the deep layer of the magnetic tape, and the video signals (pictures) on the surface layer. To enable the above recording, the instrument includes six heads.

Of six heads, heads 11 and 12 are for deep layer recording/reproduction. The heads 11 and 12 have different azimuth angle and are placed in an axial symmetric position on the periphery of a rotating drum 17.

The video heads 20 and 21 are for surface layer recording. The azimuth angle of the heads 20 and 21 are also different and placed on the periphery 60 degrees away counterclockwise from the head 11 or 12. In the figure, the direction of magnetic tape movement is indicated by an arrow A and the tape is rolled round and covers 190 degrees of the periphery of the rotating drum 17.

13 and 14 are movable heads driven based on the same principle as the prior example. The movable heads 13 and 14 are placed 60 degrees away counterclockwise from the head 20 or 21.

FIG. 26 shows the principle of multi-layer recording in accordance with the conventional example.

The heads 11 and 12 have larger gaps than the heads 20 and 21. In this example, the gap width of the heads 11 and 12 is 0.9 mm, on the other hand the gap width of the heads 20 and 21 is 0.3 mm. The width of the heads 11 and 12 are 26 microns and the width of the heads 20 and 21 is 48 microns. There is a difference in height (the distance from the center of the rotating drum 17 to the tip of a head) between the heads 20 or 21 and the heads 11 or 12, and the heads 20 and 21 are 16 micro m higher than the heads 11 and 12. The recording current supplied to the heads 11 and 12 is stronger than the current supplied to the heads 20 and 21. The heads 11 and 12 perform recording before the heads 20 and 21.

A description of the recording follows by showing the actions taken by the heads 11 and 20.

As shown in FIG. 26, the magnetic tape 19 is composed of base 19a with thickness of, for example, 16 microns, and magnetic substance layer 19b with thickness of, for example, 4 microns on top of the base. The head 11 is supplied with recording current and records voices into the deep layer of the magnetic substance layer. The head 20 is supplied with weaker recording current and records pictures on the surface layer of the magnetic substance layer 19b. The voices are recorded on the deep layer, and the pictures are recorded on the surface layer.

Because of the difference in height of the heads 11 and 20, and because of the width selection, the area scanned by the head 14 on the magnetic tape 19 completely covers the area recorded by the head 11. Therefore, the audio signals recorded by the head 11 are not exposed on the surface layer, which avoids decreasing of C/N at reproduction.

FIG. 27 shows track patterns recorded on the two layers of the magnetic tape 19. FIG. 28 shows detailed description of track patterns B3 and A4 in FIG. 27.

The tracks A1, A2 ... in FIG. 27 are recorded by the heads 11 and 14, B1, B2 ... are recorded by heads 12 and 13, and C is a control track.

The tracks A1, A2, ... and B1, B2, ... are divided into an edge area and a main area by switching points where switching of reproduction signals take place. In FIG. 28, B3 and A4 are main areas, x0, x1, y0 and y1 are switching points, X and Y indicate the length of the edge area, and V indicates the length of the main area.

The magnetic tape 19 is rolled round and covers 190 degrees of the movable drum 17 and one head performs recording/reproduction of 180 degrees of the 190 degrees, excluding the edge areas. In other words, two heads, for example the heads 11 and 12, alternately perform recording/reproduction of 180 degrees. The switching point is the point where the switching of the heads takes place.

The main area is the interval surrounded by the switching points and on this area the voices and the pictures are recorded as described above. The rest of the track (outside the main area) is named edge area. An edge area corresponds to five degrees of a rotating drum 17. With the edge area, the disappearance of reproduction signals in the neighborhood of the switching points is avoided by providing continuous reproduction signals in alternate use of two heads.

When the movable head 13 is fixed, its scanning trace will be the dotted line L4 shown in FIG. 27. The trace is the same as the trace made when the five time speedy scanning reproduction is performed (see FIG. 24). The movable head being fixed, it also generates noise and noise bars will be displayed on the reproduction screen, which was the case in the previous example.

By driving the movable heads 13 and 14, and following the track A1 with the head 13 or 14, the noise disappears. This can be achieved by driving the movable head 13 with the bimorph type piezoelectric elements 15, as illustrated in FIG. 29. The principle of the movement is the same as the one shown in FIGS. 22 and 23, and the driving voltage is also a saw-tooth-wave.

A noiseless reproduction signal can be obtained by following the tracks recorded by the heads 11, 12, 20, and 21 with the movable head 13 and 14. As shown in FIG. 30, the reproduction signal is continuous, because of the switching of the movable heads 13 and 14. As shown in FIG. 30, the reproduction signal is continuous, because of the switching of the movable heads 13 and 14 at switching points and the existence of the edge area of five degrees around the switching point.

An instrument having this kind of structure, however, has different problems from the previous example. The problems are the expensiveness due to increase in complexity of the instrument and generation of jitters caused by repeated head hammering on the tape.

The instrument includes three pairs of heads for voices, pictures and special reproduction (including speedy searching reproduction). As the number of the heads increases, the number of hammering of the heads on the magnetic tape also increases. More accurately, small vibrations of unused heads (for example, voice heads) affect actions of working heads (for examples, movable heads).

SUMMARY OF THE INVENTION

An object of the present invention is to enable noiseless special reproduction, such as speedy searching reproduction. A second object of the present invention is to enable normal reproduction and stable normal recording, solely using movable heads. A third object of the present invention is to decrease the number of heads by performing normal recording/reproduction with movable heads, which makes the instrument less expensive. A fourth object of the present invention is to suppress generation of jitters by decreasing the number of heads.

Obstacles to be removed in order to realize the first object was the difficultly in keeping facial contact with a magnetic tape.

Obstacles to be removed in order to realize the third object was the fact that movable heads could only be used during special reproduction. If movable heads can be applied in both special reproduction and normal recording/reproduction, the third object will be realized.

The realization of the second object is deeply related to the realization of the first and the third object. The realization of the fourth object is deeply related with the third object.

In order to realize the above objectives, the present invention proposes an instrument with the following structure.

The instrument comprises a rotating drum that rotates at a designated speed and contacts facially with a magnetic tape rolled round the periphery of the rotating drum. The axis of the rotating drum has a designated angle with respect to the width direction of the magnetic tape.

The instrument comprises a movable head placed on the periphery of the rotating drum so that the top, that has a gap, faces the rotating drum's contacting area with the magnetic tape. The movable head is movable along the direction of the axis of the rotating drum.

The instrument further comprises a movable head position detector that detects the position of the movable head along the axis of the rotating drum.

The instrument further comprises a movable head position controller that generates a control signal indicating the distance of the position detected by the movable head position detector and a designated standard position.

The instrument further comprises a movable head driver that drives the movable head along the axis of the rotating drum to the position indicated by the control signal generated by the movable head position controller.

With the above configuration, the position of the movable head along the axis of the rotating head is detected, and based on the detected position, the position of the movable head is controlled. Therefore, during reproduction the movable head can keep facial contact with the magnetic tape and the noises disappear. During normal reproduction, C/N is improved for the same reason. During normal recording, the position of the movable head can be kept at standard position, which stabilize recording. Moreover, the number of the heads decreases because the movable head can perform not only special reproduction but also normal recording/reproduction, which simplifies the configuration of the instrument, reduces the price of the instrument, and decreases the jitters.

The following configuration is further proposed with the present invention.

The movable head position detector is placed parallel on contact area of the rotating drum to the magnetic tape and detects the position of the movable head along the axis of the rotating drum without any contact. The configuration is effective for instruments with multiple movable heads. While a head contacts to the magnetic tape, the head detects the position of the other movable head and controls the position of the other head.

A proposal of another type of configuration follows.

The instrument includes a fixed head and determines the position of the movable head along the axis of the rotating drum with the movable head position detector by detecting the position of the track the fixed head scans.

This type of configuration is suitable for instruments with multiple pairs of heads, for example, heads for multi-layer recording. The position of the fixed head is fixed and the fixed head is used to control the position of the movable head. for low-layer recording, the movable head and the fixed head is utilized as the video head and the audio head, respectively.

With a non-contact movable head position detector, the following configuration is preferable. The movable head position detector has a light emitter and a light receptor, and the movable head position controller includes a calculator. The light emitter emits a beam toward the rotating drum along the contact area of the magnetic tape, and the light receptor receives the light reflected by either the movable head or one of the parts connected to the movable head. Based on the reflected light, the calculator calculates the position of the movable head along the axis of the rotating drum. This optical technique is used to realize non-contact position detection. The above configuration can be designed and realized easily.

An emission element and an objective lens can be used in the emitter, and a light converging means and a light receptor element can be used in the light receptor. The emission element emits a light beam of designated shape and the objective lens converges the beam to the movable head or a part connected to the movable head. The focus of the objective lens corresponds to the standard position along the axis of the rotating drum. The light converging means converges the light reflected by the target object. The light receptor element receives the converged light. The light reception element has a designated number of light reception parts and the light reception parts generate voltage according to the amount of the received light. This configuration can be realized using inexpensive materials such as light emitting diodes and photo diodes.

When an optical technique is used for the movable head position detector, the calculator includes matrix connections among reception parts and a calculation element. The matrix connections among reception parts connect output terminals with matrix connection, and convert the output voltage of the right reception parts into signal voltage that corresponds to the number of input terminals of the calculation elements. The calculation element receives the signal voltage from the matrix connections among reception parts and detects relative position of the object from the focus of the objective lens. Furthermore, the calculation element supplies, to the movable head position controller, the relative distance from the desired position along the axis of the rotating drum. In this configuration the nonuniformity of the reflection is utilized.

A preferred configuration of the movable head position detector follows. The movable head position controller includes a switcher and a track follower. The switcher supplies different signals at recording and at reproduction to the movable head driver. At recording the output from the calculation element is supplied, and at reproduction the output of the track follower is supplied. The track follower detects the positions of tracks formed on the magnetic tape, generates head driving signals at reproduction, and supplies the head driving signals to the movable head driver through the switcher. The above configuration enables initialization of the position of the movable head at recording time, and the following of the formed tracks at reproduction using a circuit with simple structure.

When the fixed head is used for the movable head position detector, the movable head position detector can be realized by a reproducer and a track position servo mechanism. The reproducer reproduces the signal recorded by the fixed head. The track position servo mechanism detects the center position of the recorded track by the fixed head, based on the signal reproduced by the reproducer. With this configuration the movable head position detector includes a movable head positioning means. The movable head positioning means generates the above control signal according to the center position detected by the track center position detector. The signal supplied by the reproducer has, in general, information about scanning position of the movable head on the formed track by the fixed head so that the position of the movable head is decided by the information.

The track center position servo mechanism can include a reproduction signal extraction circuit, a level detector, and a track center position detector. The reproduction signal extraction circuit extracts reproduction signals that include constant level signals from signals reproduced by the reproducer. The level detector detects the level of the reproduction signal extracted by the reproduction signal extraction circuit. The track center position detector detects the difference (the amount of decrease) of (a) the levels detected by the level detector and (b) the level of the reproduction signal when the center position of the track recorded by the fixed head and the track scanned by the movable head agrees. Furthermore, the track center position detector generates the difference as the fixed head's relative position with respect to the movable head along the axis of the rotating drum. In this configuration, the level of the reproduction signal is used as the indicator of the track position contained in the signals obtained by the reproducer. Therefore, the level of the signals recorded on the magnetic tape must be flat. An FM signal can be used for this purpose.

When the track of the fixed head is used to control the movable head, the movable head position controller can include a record on/off mechanism and a center position detection controller. By the record on/off mechanism, the movable head performs recording within the period when the fixed head performs recording. The center position detection controller makes the track center position servo mechanism detect the center position of the track recorded by the fixed head, while the movable head is not performing recording and the fixed head is performing recording. With this configuration, the period of movement of the fixed head and the period for reproduction of position controlling information of the movable head is different. The exterior of the switching point in the track can be utilized for realizing the above configuration.

The center position detection controller includes a scanning signal generation circuit. The scanning signal generation circuit makes the movable head driver drive the movable head using the control signal, while the movable head is not recording and the fixed head is recording.

The movable head driver can include an actuator that moves the movable head according to the control signal generated by the movable head position controller along the axis of the rotating drum.

With the actuator, the movable head driver has a movable head supporter that supports the movable head at the free endpoint. One endpoint of the movable head supporter is connected to the actuator and the other endpoint is free. The movable head is driven by the actuator through the movable head supporter. The driving direction is the same as the direction of the axis of the rotating drum and the driving amount is equal to the driving amount of the actuator.

Detailed description of the configuration of the actuator follows. The actuator includes more than one circular springs, a bobbin, a coil, and a permanent magnet. The circular springs are positioned parallel to and along the axis of the rotating drum. One of the springs have a projection that supports the movable head. The spring has a designated elasticity in the direction of the axis of the rotating drum and bends with the movement of the bobbin. In the neighborhood of the center of each circular spring there is a hole that holds the bobbin that goes through the holes of the circular springs. The bobbin is held in the air so that the axis of the bobbin is parallel to the axis of the rotating drum.

The coil is rolled round the bobbin. Current corresponding to the control signal generated by the movable head position controller is supplied to the coil, which generates a magnetic field inside the actuator. The constant magnetic field repulses the magnetic field generated by the coil and moves the bobbin along the axis of the rotating drum. The movement corresponds to the magnitude of the magnetic field generated by the coil.

Compared with the conventional configuration with bimorph type piezoelectric elements, more even and greater amount of driving of the movable head is enabled.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawing and its description will facilitate an understanding of the invention. These drawings are given by way of illustration only and thus are not limitative of the present invention, and wherein:

FIG. 10 shows the sign of the output of the differential amplifier when the projection of the circular spring supporting the movable head is too close to the focus of a objective lens;

FIG. 11 shows the sign of the output of the differential amplifier when the projection of the circular spring supporting the movable head is on the focus of the objective lens;

FIG. 12 shows the sign of the output of the differential amplifier when the projection of the circular spring supporting the movable head is too distant from the focus of the objective lens;

FIG. 13 is a characteristic figure that shows the relation of a focus error signal generated by a differential amplifier and the position of the movable head;

DESCRIPTION OF THE PREFERRED EMBODIMENTS

Preferred embodiments in accordance with the present invention are described.

Figure 1:
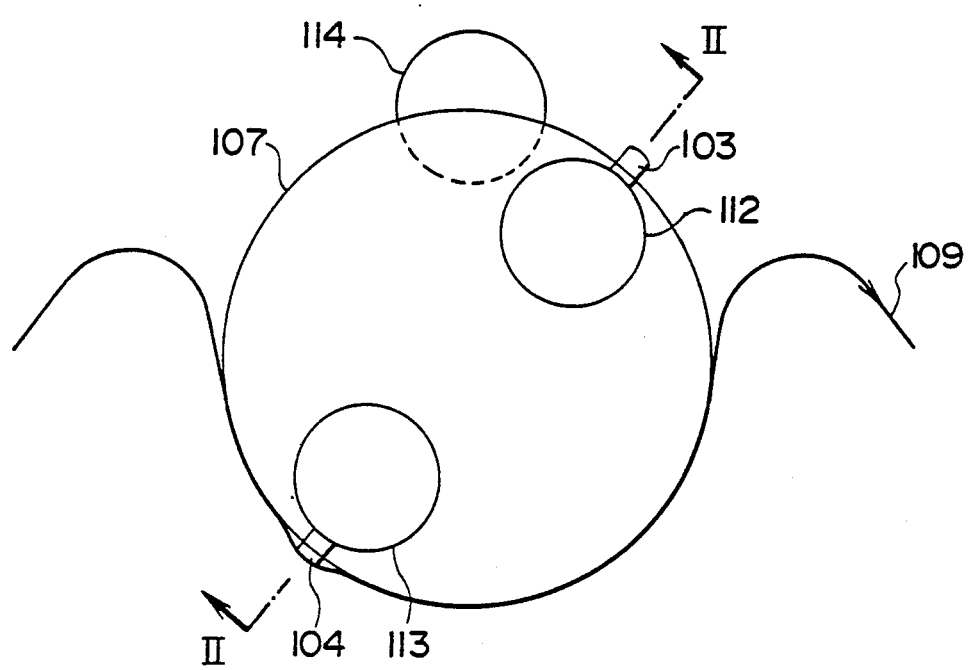
FIG. 1 is a plan view that describes the position of heads in the first preferred embodiment in accordance with the present invention, where a pair of movable heads are shown.

FIG. 1 describes the first embodiment in accordance with the present invention. In the embodiment a rotating drum 107 includes two movable head units 112 and 113 that drive movable heads 103 and 104.

The movable heads 103 and 104 are placed symmetrically with respect to the rotating drum 107. A magnetic tape 109 is rolled round and covers 190 degrees of the periphery of the rotating drum 107. Therefore, the movable heads 103 and 104 alternately scan the surface of the magnetic tape 109 as the rotating drum 107 rotates.

The embodiment also includes a movable head position detector 114 that is fixed to the covering box of the instrument. The movable head position detector 114 is positioned parallel to the axis of the rotating drum 107 so that the periphery of the rotating drum can be seen.

For example, the movable head position detector, can be placed at a symmetrical position with respect to the rolling point of the magnetic tape 109 from the axis of the rotating drum 107.

Figure 2:
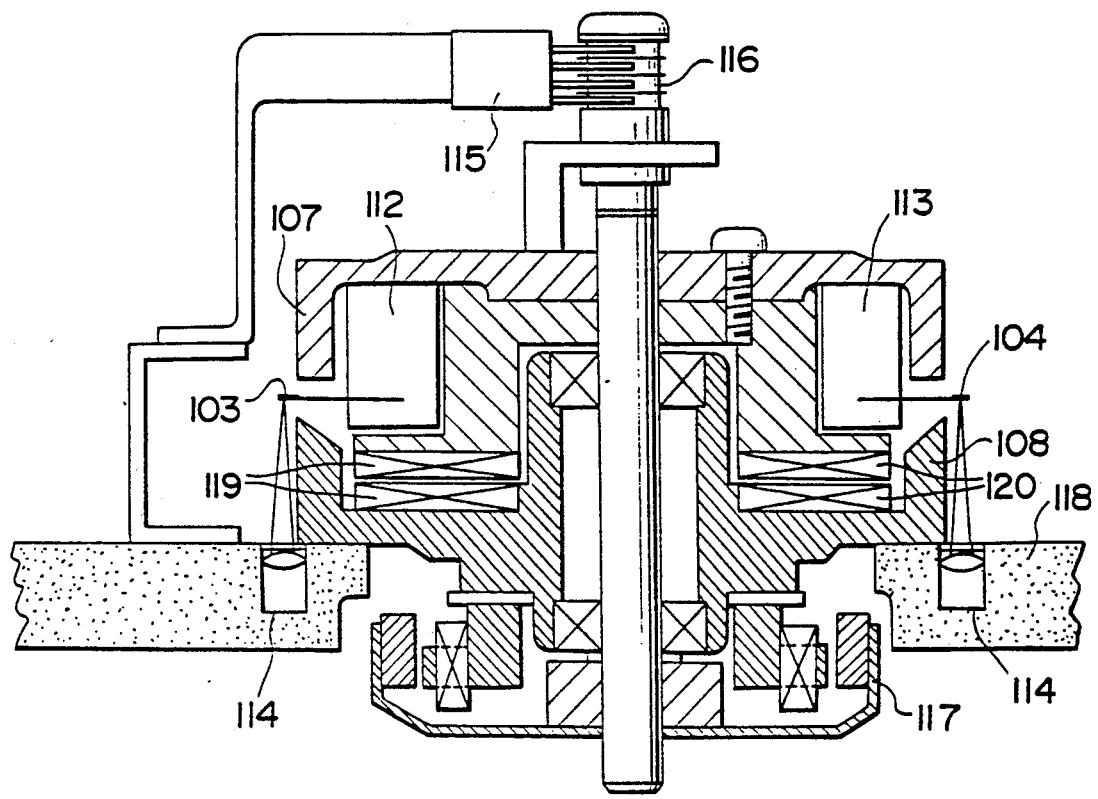
FIG. 2 is a II—II cross-sectional view of the instrument in FIG. 1, where the position of the movable head detection unit is shown.

FIG. 2 is a II—II cross-sectional view of the instrument in FIG. 1. In this figure, an electrode brush 115 that supplies current to coils embedded in the movable heads 103 and 104 is shown. The electrode brush 115 contacts with a slip ring 116 that is attached on the axis of the rotating drum 107 and rotates with the rotating drum.

The rotating drum 107 is rotated by a drum motor 117 at the speed of 1800 rpm. The stator of the drum motor 117 is fixed to a deck plate 118 through the fixed drum 108. The fixed drum 108 and the rotating drum 107 have the same axis.

Rotary transformers 119 and 120 are on the surface of the fixed drum 108 facing the rotating drum 107. The rotary transformers have two sections and the upper part in FIG. 2 stands still with respect to the rotating drum 107 and the lower part stands still with respect to the fixed drum 108. At reproduction a reproduction signal is supplied to a coil on the side of the rotating drum 107 of the rotary transformer 119 and 120 from the movable heads 103 and 104, which generates a magnetic field and interlinks with a coil on the side of the fixed drum 108. As a result, the reproduction signal is extracted from the coil on the side of the fixed drum 108 of the rotary transformer 119 and 120. At recording the reverse actions take place.

The movable head units 112 and 113 are fixed to the bottom surface of the rotating drum in a symmetrical position with respect to the axis of the rotating drum. The movable head units 112 and 113 cause parallel and vertical transition of the movable heads 103 and 104 in the figure, while the movable head position detection unit 114 is fixed to the deck plate 118.

Detailed structure of the movable head unit 112 and 113, and the movable head position detection unit 114 are described below and FIG. 2 shows only a schematic diagram.

Figure 3:
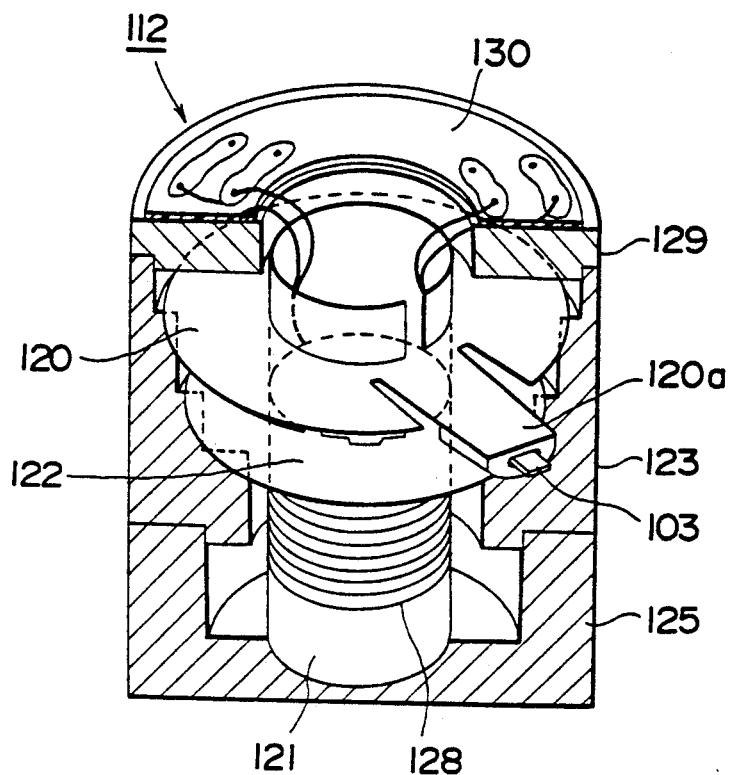
FIG. 3 is a cross-sectional view of a movable head unit, where perspective illustration of parts related to the driving of the movable head is shown.
Figure 4:
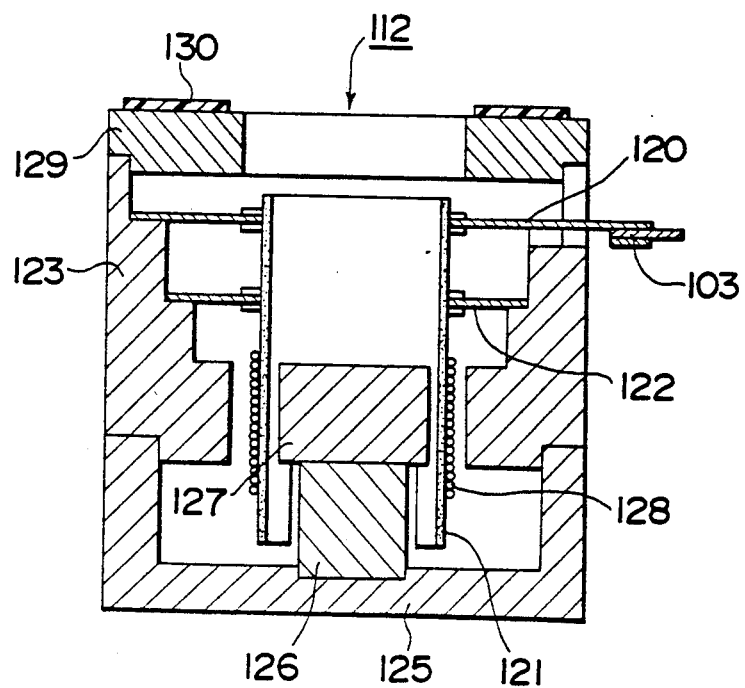
FIG. 4 shows a cross-sectional view of the movable head unit.

FIG. 3 and FIG. 4 show the internal structure of the movable head unit 112. Description of the movable head unit 113 will be omitted because it has the same structure as the movable head unit 112. In order to simplify FIG. 3, parts directly related to the driving of the movable head 103 are described with a perspective illustration and other parts are described with a cross-sectional view. FIG. 4 is a cross-sectional view of the movable head unit 112 as a whole.

The movable head unit 112 moves the movable head 103 in the direction parallel to the axis of rotation of the rotating drum 107. Therefore, the movable head unit 112 functions as an actuator.

The movable head 103 is fixed to a projection 120a of a circular spring 120. The movable head 103 is connected to the coil on the side of the rotating drum 107 of the rotary transformer 119. At the center of the circular spring 120, there is a hole and an air-core bobbin 121 goes through the hole. Within the hole, the circular spring 120 is fixed to the air-core bobbin 121. In FIG. 4, when the air-core bobbin 121 moves up and down, the circular spring 120 bends and the movable head 103 fixed to the projection 120a moves up and down.

Under the circular spring 120, there is another circular spring 122 that is fixed to the air-core bobbin 121. The periphery of the circular springs 120 and 122 are glued to a yoke 123 made of soft iron. The circular springs 120 and 122 support the air-core bobbin 121 so that the air-core bobbin 121 can move up and down in FIGS. 3 and 4.

Figure 5:
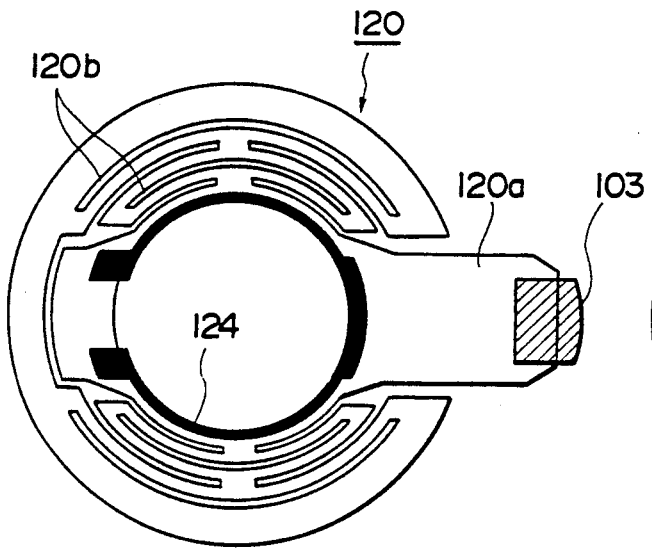
FIG. 5 is a plain view that describes the structure of a circular spring to which a movable head is attached.
Figure 6:
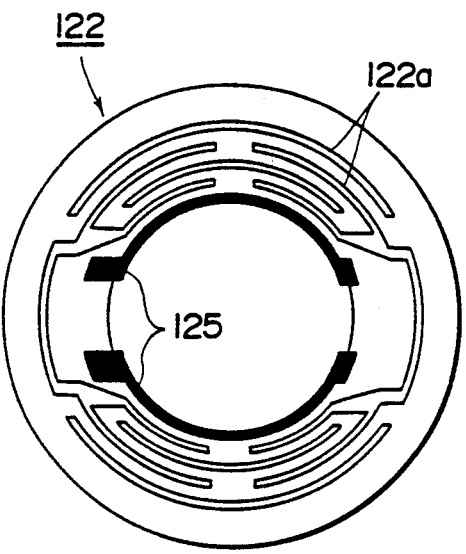
FIG. 6 is a plain view that describes the structure of the circular springs that supports the bobbin parallel to the circular spring in FIG. 5.

The circular springs 120 and 122 have structures shown in FIGS. 5 and 6, respectively. The circular springs 120 and 122 are made of copper alloy with thickness about 0.08 mm and have circular slits indicated by 120b and 122a respectively. With the slits bending stress due to the movement of the air-core bobbin 121 is absorbed by the slits 120b and 122a. In other words they work as springs.

Forming parts 124 and 125 are inserted in the center hole of the circular springs 120 and 122. The forming parts 124 and 125 are placed between the circular springs 120 and 122, and the air-core bobbin 121. The forming parts 124 and 125, and the air-core bobbin 121 are made so that the contact surfaces have enough friction, or they are adhered so that the circular springs 120 and 122, and the air-core bobbin 121 are fixed.

The yoke 123 is inserted into another yoke 125 also made of soft iron. A permanent magnet 126 made of rare earth cobalt is fixed to the center of the bottom of the yoke 125. The permanent magnet 126 has the same axis as the air-core bobbin 121 and has a smaller diameter.

A pole piece 127 is adhered to the upper part of the permanent magnet 126. The pole piece 127 is made of soft iron and acts as a core of the actuator function of the movable head unit 112. A copper coil 128 with diameter of approximately 0.1 mm is rolled round the air-core bobbin 121.

A cap 129 is inserted at the upper part of the yoke 123 and a printed wiring board 130 is placed on the upper part of the cap 129. The printed wiring board 130 is connected and supplies current to the coil 128 and drives the air-core bobbin 121, hence, the movable head 103.

Figure 7:
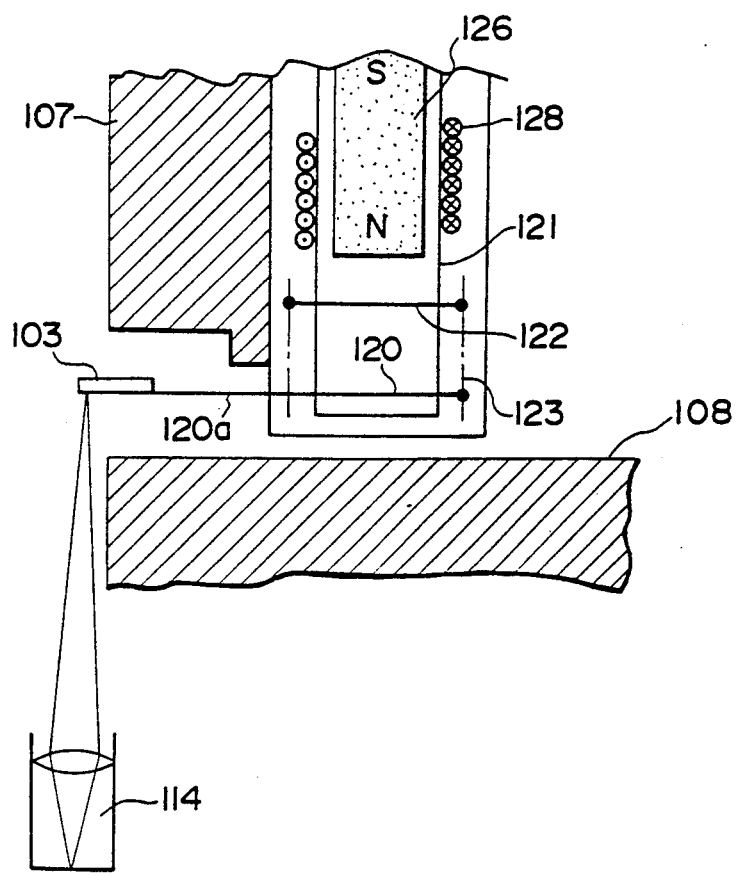
FIG. 7 is a cross-sectional view that describes the principle of the movement of the movable head unit.

FIG. 7 shows a conceptual view of the movable head unit 112. It is drawn upside down compared with the FIG. 4.

When the permanent magnet 126 is placed and current is supplied to the coil 128 so that the polarity on the side of the pole piece 127 is N, the air-core bobbin 121 moves due to the force generated following Fleming's rule, whose strength force is proportional to the magnitude of the current. In FIG. 7 the pole piece 127 is omitted.

The force drives the movable head 103. Due to the bending of the circular spring 120, the movable head fixed to the projection 120a moves up and down. Therefore, desired movement of the head 103 along the axis of the rotating drum 107 is enabled by controlling the direction and the magnitude of the current supplied to the coil 128.

With the instrument of this embodiment, normal reproduction and special reproduction (speedy searching and the like) can be executed while maintaining facial contact of the movable heads 103 and 104 to the magnetic tape 109, which enables picking up of recorded signals (generally FM signals) on the magnetic tape 109 to the maximum amount. Moreover, damage of the magnetic tape by the movable heads 103 and 104 is avoided.

Figure 8:
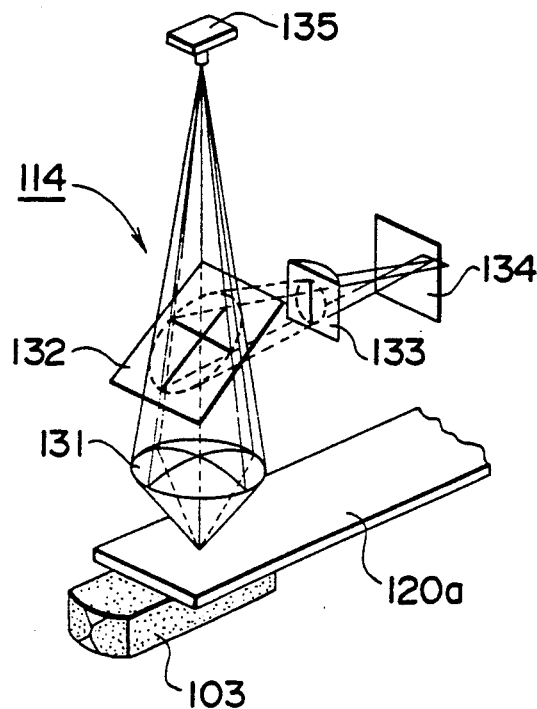
FIG. 8 is a perspective illustration that describes the structure of a movable head position detection unit, where supporting parts that fix or support materials are omitted.
Figure 9:
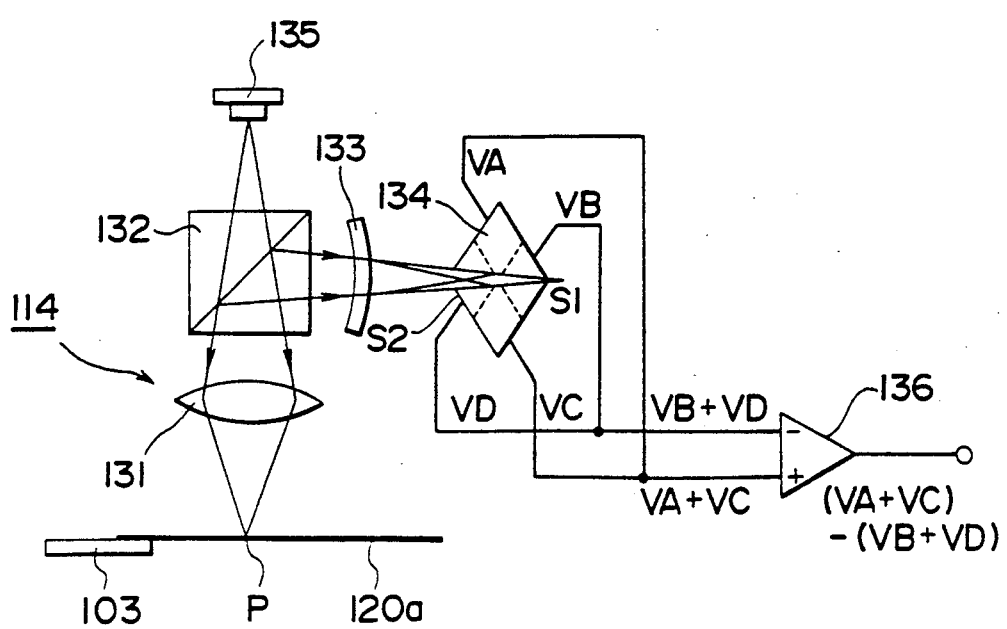
FIG. 9 is a circuit diagram that describes the structure of a movable head position detection unit, where the relationship of the input and the output of a differential amplifier is described.

In the embodiment, a movable head position detection unit 114 is used. The movable head position detection unit 114 is placed as shown in FIG. 7 and its structure is described in FIGS. 8 and 9, and its actions are described in FIGS. 10 through 13.

The movable head position detection unit 114 comprises a objective lens 131, a beam splitter 132, a cylindrical lens 133, a photo diode 134, an illuminant source light emitting diode 135 and a differential amplifier 136.

The objective lens 131 is placed on the side of the movable head (103 in the figure), and focuses the light generated by the illuminant source light emitting diode 135 on the projection 120a supporting the movable head 103.

The beam splitter 132 is placed between the illuminant source light emitting diode 135 and the objective lens 131, supplies the light generated by the illuminant source light emitting diode 135 to objective lens 131 separates the light which is reflected and supplied by the projection 120a via the objective lens 131, and supplies the reflected light to the photo diode 134.

The cylindrical lens 133 is placed between the beam splitter 132 and the photo diode 134. The reception surface of the photo diode 134 is divided into four parts and the photo diode 134 generates output voltage VA, VB, VC and VD that reflect the received amount of the light on each of four parts.

The differential amplifier 136 performs matrix calculation of the voltages VA, VB, VC and VD and amplifies the voltages. The sum of the voltages VA and VC is included in the non-reversal input and the sum of the voltages VB and VD is included in the reversal input. Therefore, the output of the differential amplifier 136 is proportional to (VA+VC)−(VB+VD).

Description of actions of the movable head position detection unit 114 follows.

The beam emitted by the illuminant source light emitting diode 135 is supplied to the objective lens 131 via the beam splitter 132. The objective lens 131 focuses the beam on a point on the projection 120a and the projection 120a reflects the beam. The reflected light is supplied to the direction of the illuminant source light emitting diode 135 by the objective lens 131. The beam will be focused on the light reception surface of the photo diode 134 because of the existence of the beam splitter 132 between the objective lens 131 and the illuminant source light emitting diode 135. In this embodiment, the converging spot is designed to be the focus point of the light reception surface divided into four parts.

The converging spot P on the reception surface of the photo diode 134 transforms according to the position of the projection 120a (thus, the movable head 103). When the projection 120a is on the focus of the objective lens 131, the converging spot P almost forms a circle. In this case, the voltages VA, VB, VC, and VD are almost equal and the output of the differential amplifier 136 becomes 0 as shown in FIG. 11.

When the projection 120a is closer to the objective lens 131, the converging spot P forms an ellipse due to astigmatism as shown in FIG. 10. If the voltages VA and VC and VA, VB, VC and VD are placed so that they reflect the length of the major axes of the ellipse, the output of the differential amplifier 136, (VA+VC)−(VB+VD) will be positive.

On the other hand, when the projection is more distant than the focus, the converging spot P forms an ellipse with the longer horizontal axis. In this case, the output of the differential amplifier 136 will be negative.

Therefore, in the embodiment the position of the movable heads 103 and 104 is detectable by examining the output of the differential amplifier 136. The output of the differential amplifier 136 will be called a focus error signal hereafter. The relation between the focus error signal and the movable heads can be described as shown in FIG. 13. When the projection is in the neighborhood of the focus of the objective lens 131, the focus error signal and the distance of the movable head from the focus are proportional.

The focus error signal can be used for control of the current supplied to a coil 128. If the current supplied to the coil 128 is adjusted according to the focus error signal when the focus error signal is nonzero, the position of the projection 120a, hence the position of the movable head 103, can be controlled so that the focus error signal becomes zero.

Figure 14:
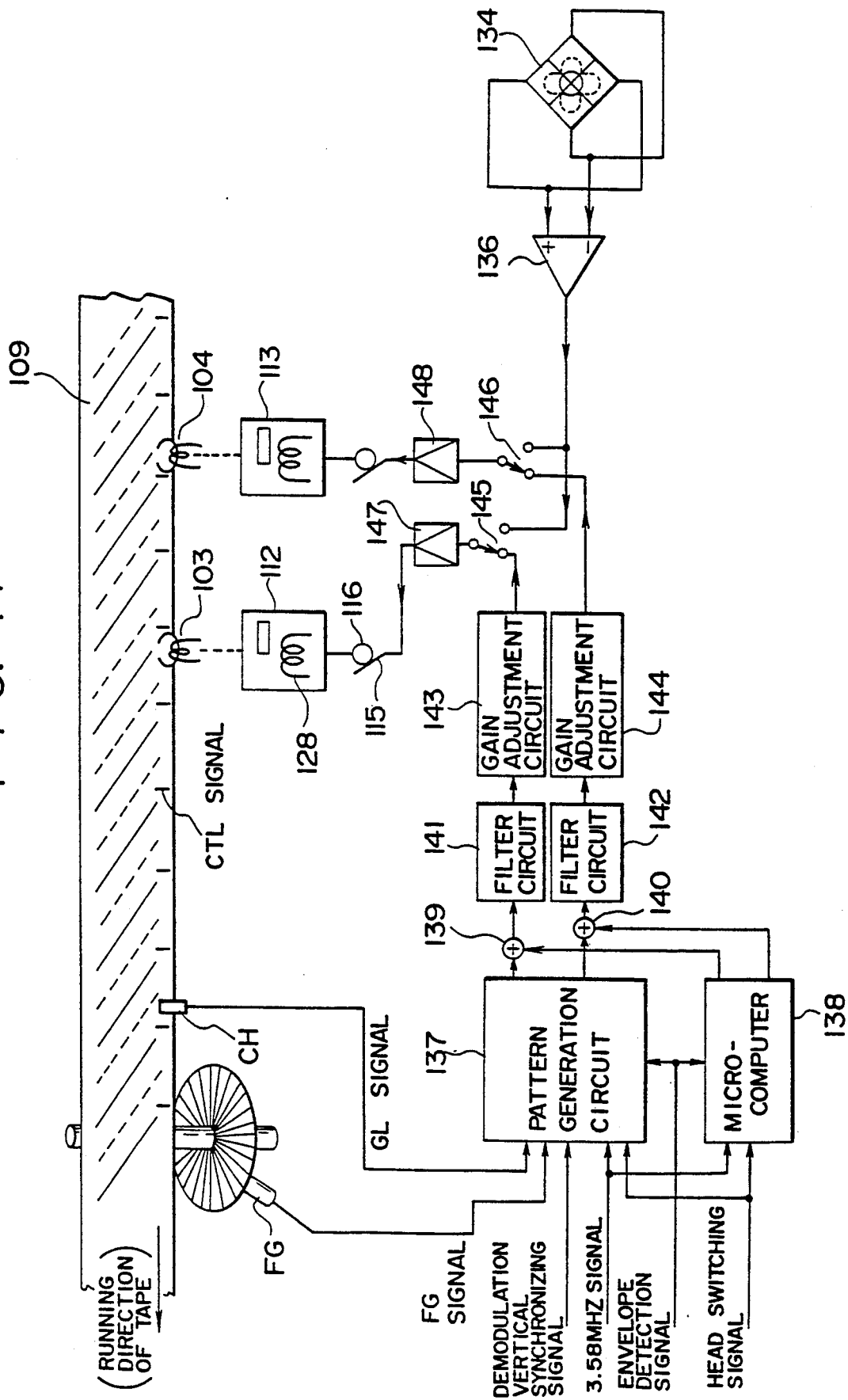
FIG. 14 is a block diagram that describes the structure of a focus servo system of the first preferred embodiment.

The system related to the above mentioned control, called focus servo control, has structure shown in FIG. 14. FIG. 14 shows a driving system circuit of the present embodiment comprising the focus servo control mechanism. The circuit includes a capstan frequency oscillator (FG) and a control head (CH) that are connected to a pattern generation circuit 137. There is a microcomputer 138 next to the pattern generation circuit 137. The pattern generation circuit 137 and the microcomputer 138 receive a 3.58 MHz demodulation vertical synchronizing signal and head switching signal that is related to the head switching.

Both of the outputs from the pattern generation circuit 137 and the microcomputer 138 are connected to addition circuits 139 and 140. Following the addition circuits 139 and 140 are filter circuits 141 and 142, gain adjustment circuits 143 and 144, circuit changing switches 145 and 146, and current amplifiers 147 and 148, sequentially connected.

The circuit changing switches 145 and 146 are connected to the differential amplifier 136 and alternatively the gain adjusting circuits 143 and 144. The amplifiers 147 and 148 are connected as shown in FIG. 2. In FIG. 2, only one of the electrode brushes and one of the slip rings are shown, whereas two of each are shown in FIG. 14. This is because electrode brushes and slip rings related to the movable head units 112 and 113 are drawn as a part. FIG. 14 explicitly describes the function of the structure in FIG. 2.

The actions of the circuit follows.

Firstly, actions taken at reproduction are described.

At reproduction the pattern generation circuit 137 and the microcomputer 138 receive an envelope detection signal, which is obtained by the envelope signal, the FG signal and a GL signal, which is obtained by reproducing a running control signal (CTL signal) by the CH, and calculates the amount of the movement of the movable heads 103 and 104.

The amount of the movement obtained by the pattern generation circuit 137 and the microcomputer is propagated, then the coils of the movable head units 112 and 113 receive the current corresponding to the amount of the which cause the desired movement of the heads 103 and 104.

The movable head position detector 114 does not detect the position of the movable heads 103 and 104 at reproduction. Wherever the movable heads 103 and 104 are positioned, the functions of the light emitting diode 135, the photo diode 134 and the differential amplifier 136 embedded in the movable position detector 114 are disabled. For example, the circuit changing switches 145 and 146 are connected to the gain adjustment circuits 143 and 144.

At reproduction, a correction action for agreement of the rotating plane of the movable head 103 and 104 is performed by calculating the amount of the movement by the pattern generation circuit 137 and the microcomputer 138 based on the CTL signal and the FG signal.

The calculation is possible since the FG signal divides the CTL signal effectively. At recording the CTL signal is recorded on the control track of the magnetic tape 109 as designated by CH, and the FG signal is generated periodically in a designated interval as the magnetic tape runs. Therefore, based on the CTL and FG signals, the current track position be detected. If the current track position is detected, the rotating plane of the movable heads 103 and 104, and the track position can be agreed, by moving the movable heads 103 and to the detected position.

For example, if the reproduction speed of the magnetic tape 109 is faster than the standard speed, the movable 103 and 104 will be moved downward along the axis of the rotating drum 107 in FIG. 7. On the other hand, if the reproduction speed of the magnetic tape 109 is slower, the movable heads 103 and 104 will be moved upwards along the axis of the rotating drum 107. The upward and downward movement is performed by controlling the supplied current to the coils of the movable head units 112 and 113.

As described above, independent from the reproduction speed of the magnetic tape 109, the rotating plane of the movable heads 103 and 104, and the track position agree and movable heads 103 and 104 can precisely follow a track for a field interval.

Secondly, actions taken at recording are described.

At recording, the envelope signal can not be obtained because no information is recorded on the magnetic tape 109. In other words, the tracks which the movable heads are to exist. Therefore, the positions of the movable heads 103 and are to be controlled to the standard position.

The standard position setting action is enabled with the movable head position detection unit 114. The focus error signal generated by the differential amplifier 136 embedded in the movable head position detection unit 114 becomes nonzero when the projection of the circular spring shifts from the focus of the objective lens. The circuit changing switches 145 and 146 that follow the differential amplifier 136 are connected to the gain adjustment circuits 143 and 144 reproduction and are connected to the differential amplifier at recording so that the focus error signal can be supplied to current amplifiers 147 and 148 at recording. As shown in FIG. 13, the focus error signal is proportional to the amount of movement at least within the interval of small magnitude. Thus, by adjusting the current supplied to the coils of the movable heads 112 and 113 according to the focus error signal, the position of the movable heads 103 and 104 can be adjusted to the standard position.

In this embodiment, each of the movable head units 112 and 113 have two circular springs, but the present invention does not restrict the number of the circular springs, and the slits of the circular springs are not restricted to be circular, either. Radial slits, for example, are also usable. The thickness of the circular springs are to be determined by the designer based on the elasticity and the reliability required with the circular springs. Other types of plane springs can be used. Furthermore, one of the circular springs can be omitted and instead one endpoint of the bobbin can be supported.

Wider distance between circular springs are preferable for maintaining the degree of parallel contact of the bobbin. A coil can be placed between the circular springs.

Furthermore, the structure of the coil used in the movable head in the present embodiment can be replaced with another type of structure.

The movable head position detection unit 114 can be constructed without using optical mechanisms. This unit detects the position of the movable head without direct to the movable heads. If the same function is realized, structures based on other principles can be applied. In this embodiment, the position detection of the movable heads are performed indirectly using the position of the projection, however, it is also possible to directly detect the position of the movable heads. In this case, the movable heads must include a means to reflect the beam.

The position of the movable head position detection unit 114 can be anywhere on the periphery of the rotating drum 107 and can be above or below the rotating drum. The amount of the movement at recording can be controlled by adding the output the differential amplifier circuit 136 or signal corresponding to it to the pattern generation circuit 137.

Figure 15:
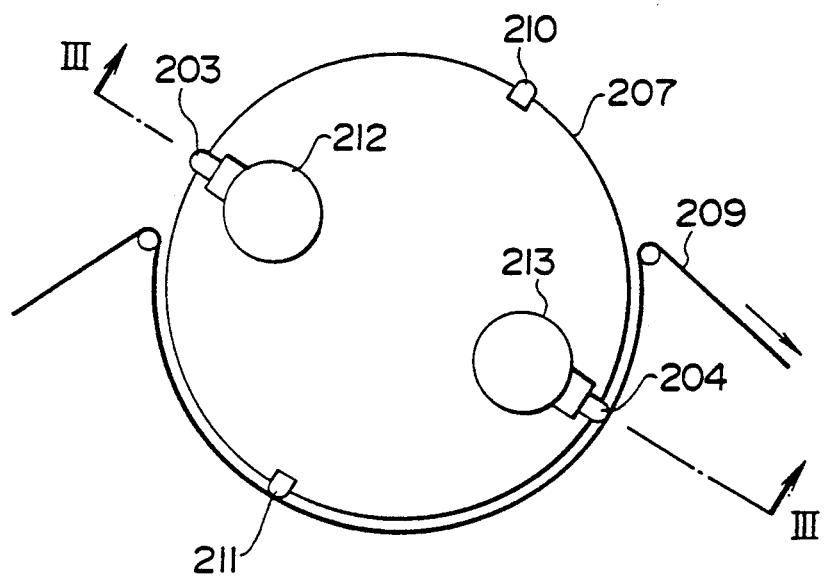
FIG. 15 is a plain view that describes the head position in the second preferred embodiment of the present invention.

FIG. 15 describes a rotating magnetic head instrument as a second embodiment in accordance with the present invention.

In this embodiment there are two pairs of heads, a pair of fixed heads 210 and 211 and a pair of movable heads 203 and 204, on the periphery of the rotating drum 207. The movable heads 203 and 204 are positioned 90 degrees clockwise respect to the fixed heads 210 and 211. The movable heads 203 and 204 are driven by the movable head units 212 and 213 respectively along the axis of the rotating drum 207.

Figure 27:
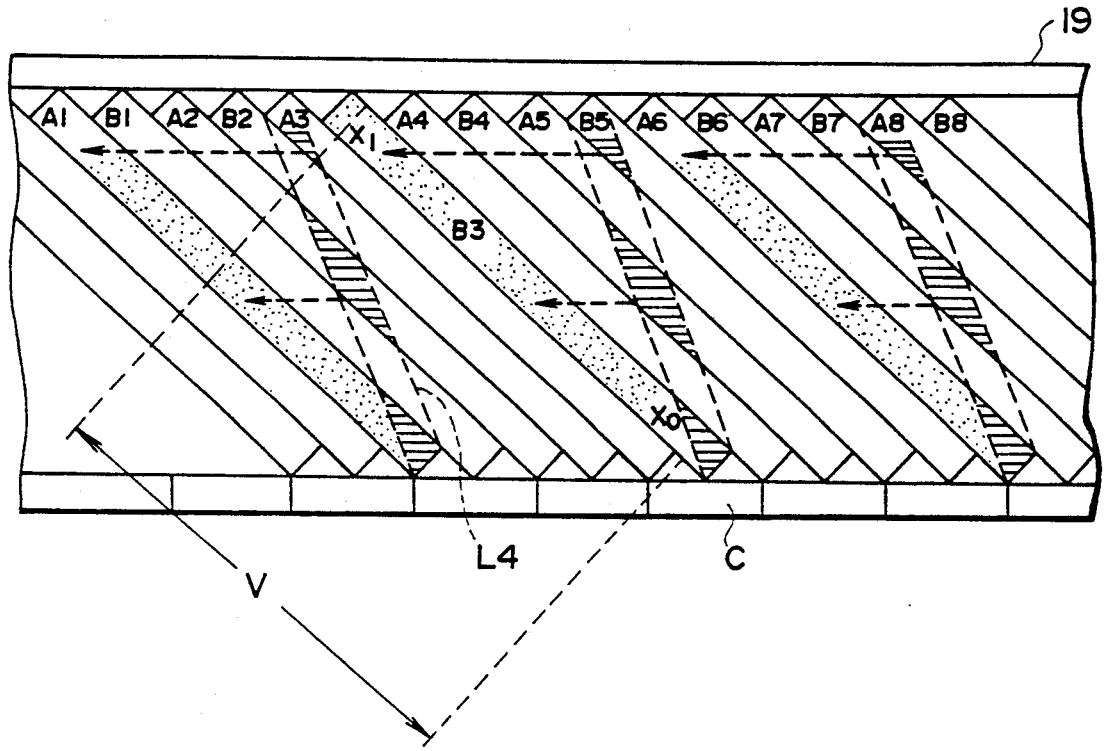
FIG. 27 shows the track pattern obtained by the second conventional embodiment.
Figure 28:
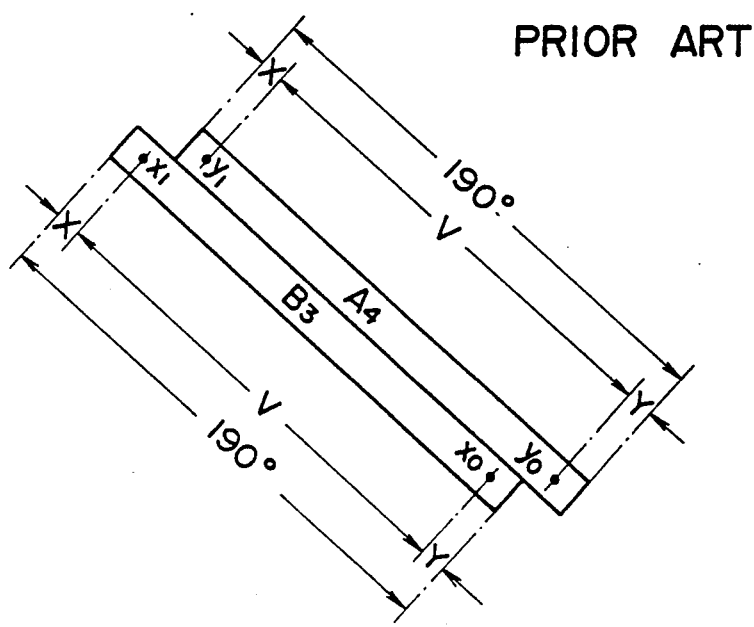
FIG. 28 shows the structure of each track.
Figure 29:
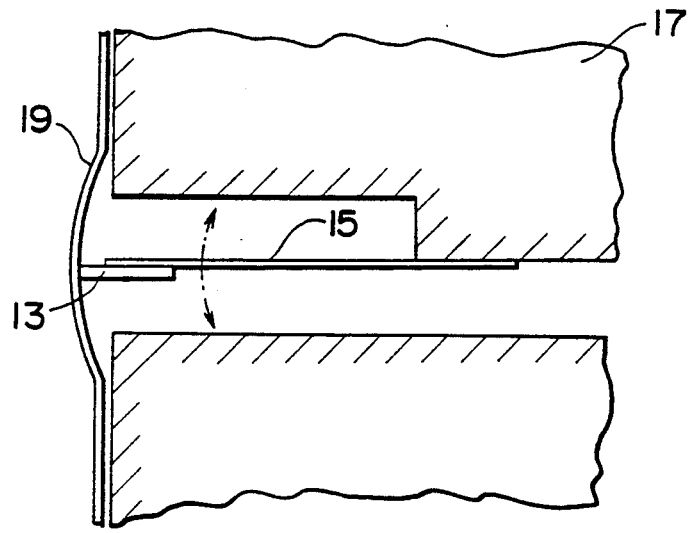
FIG. 29 is a cross-sectional view that describes the movement of the movable heads.
Figure 30:
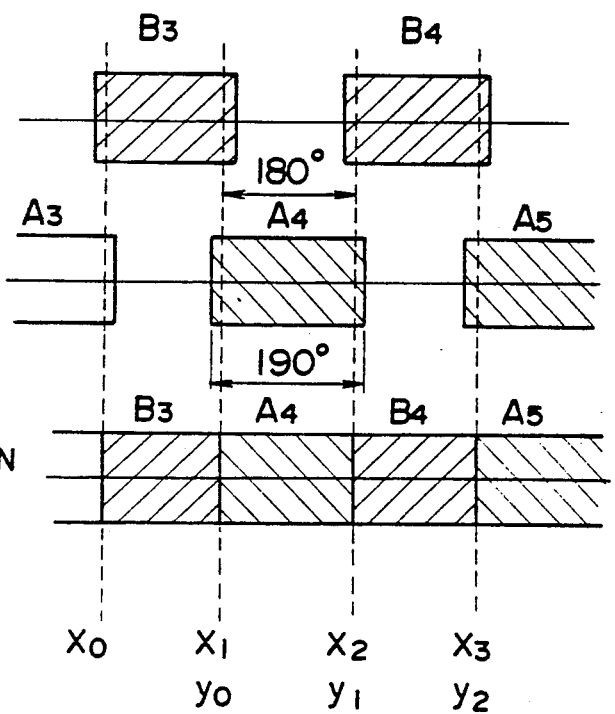
FIG. 30 is a timing chart at reproduction in the second conventional embodiment.

The fixed heads 210 and 211 perform deep layer recording/reproduction of voices to the magnetic tape is rolled round and covers 190 degrees of the movable The movable heads 203 and 204 perform recording/reproduction of the surface layer. The track pattern obtained on the magnetic tape 209 is the same as the track pattern described FIG. 27 of the second conventional embodiment.

Figure 16:
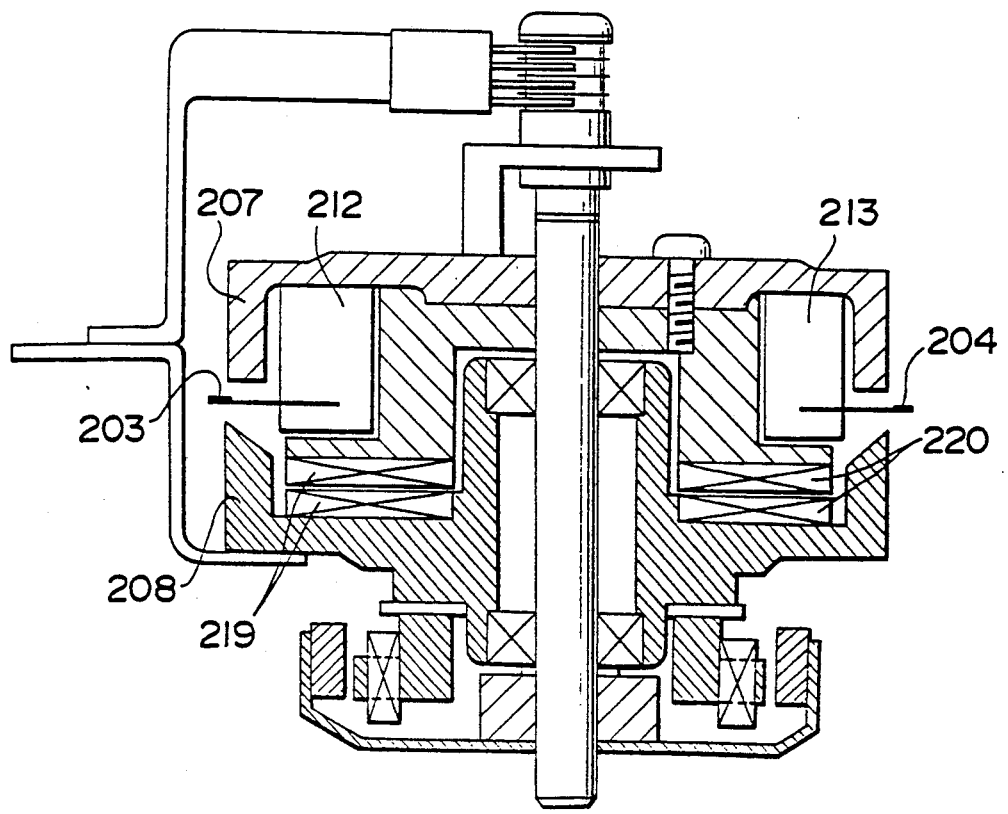
FIG. 16 is a III—III cross-sectional view of the instrument of FIG. 15.

FIG. 16 shows a III—III cross-sectional structure of the embodiment. This figure has the same configuration as FIG. 2. As shown in FIG. 16, III—III cross sectional structure is same as the II—II cross sectional structure of the previous embodiment. Except for the fixed heads 210 and 211, the structure of the two embodiments are quite similar.

Figure 17:
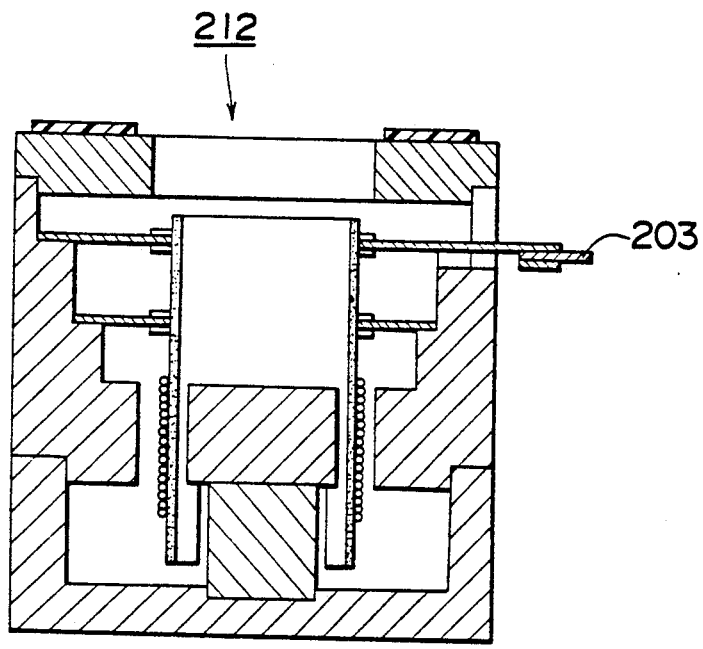
FIG. 17 is a cross-sectional view that describes the structure of a movable head unit.

FIG. 17 shows a cross-sectional structure of 212 that drives the movable head 203 of the movable head unit used in this embodiment. The other movable head unit 213 has the same structure. As shown in the figure, the movable head units 212 and 213 are the same as the movable head units 112 and 113 in the first embodiment and explanation of the structure and the actions are omitted.

Figure 18:
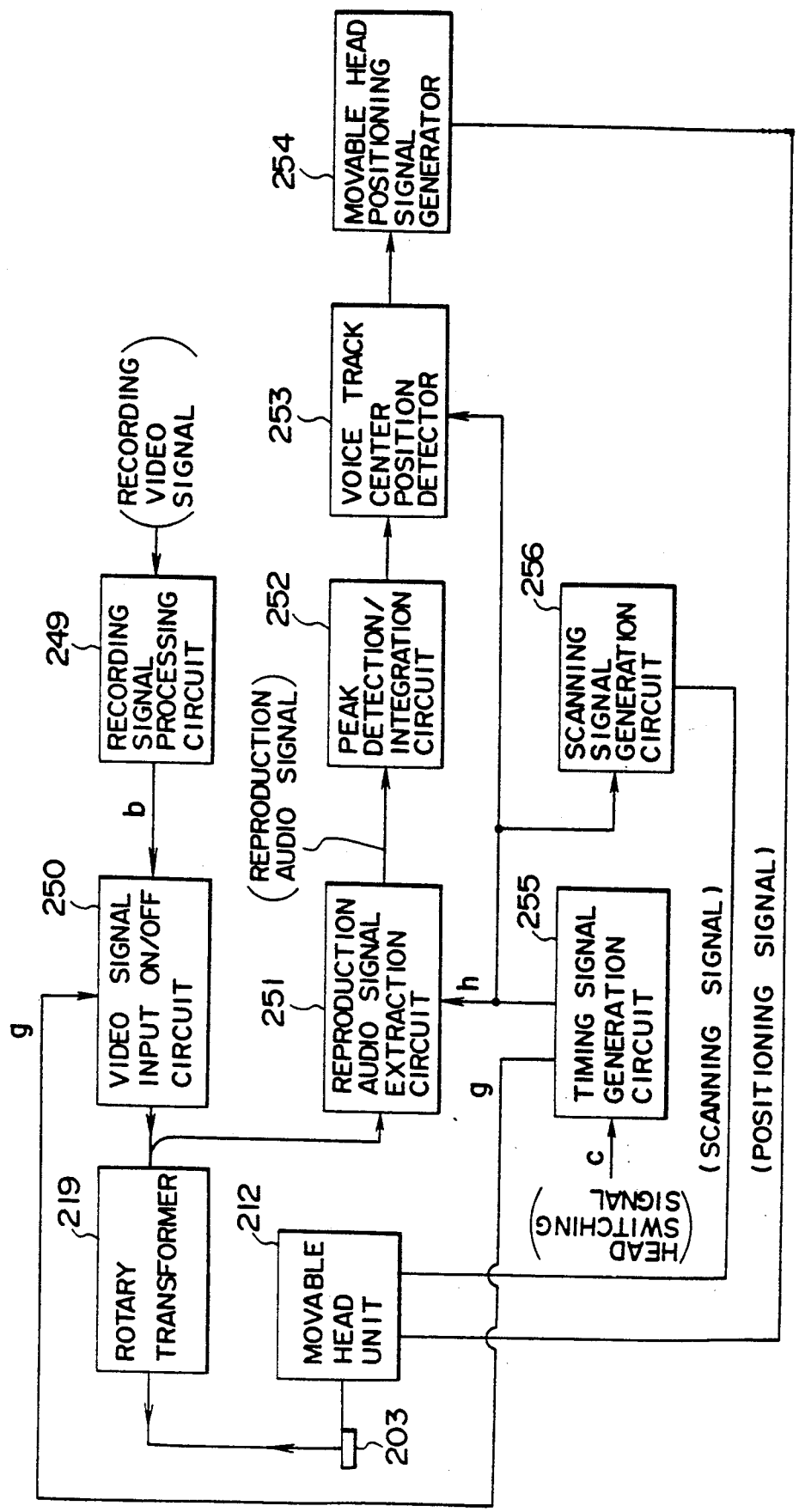
FIG. 18 is a block diagram that shows the circuit structure of a video system of the second preferred embodiment, where the circuit of one of two movable heads is shown.
Figure 19:
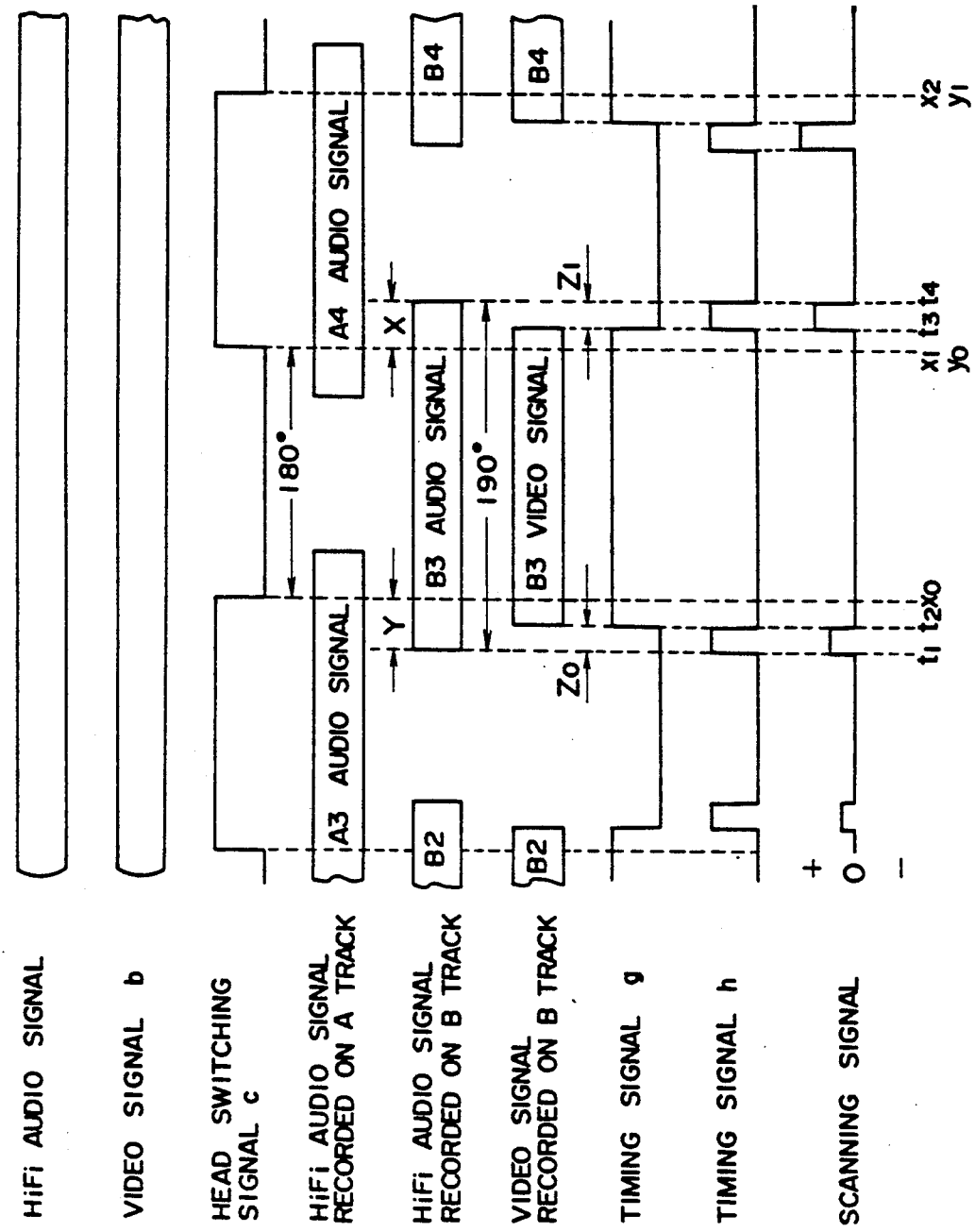
FIG. 19 is a timing chart that shows the timing of picture recording by the circuit shown in FIG. 18.

FIG. 18 shows the circuit structure of the present embodiment and FIG. 19 shows the timing of the actions of each circuit of the present embodiment. Here, the circuit belongs of the video signal recording system corresponding to the movable head 203. The video signal recording system circuit for the other movable head 204 is structured in the same manner. In designing the circuit, the structure of circuits is simplified by joining a part of the circuits. The circuit structure and the actions of the video signal recording system (actions at recording) of the present embodiment follows.

The deep layer recording of voices in the embodiment is realized by the fixed head 210 and 211. The actions of the fixed heads 210 and 211 are the same as the heads 11 and 12 of the second conventional embodiment. In this embodiment, different from the second conventional embodiment, the surface layer recording is performed by the movable heads 203 and 204.

At first, a video signal to be recorded (recording video signal) is received by a recording signal processing circuit 249. The recording signal processing circuit 249 converts the recording video signal into a video signal b that is suitable for magnetic recording. The recording signal processing circuit 249 supplies the continuous video signal b to a rotary transformer 219 via a video signal input on/off circuit 250.

The rotary transformer 219 contains a coil on the side of the fixed drum 208 and a coil on the side of the rotating drum 207. Therefore, the video signal b is supplied to the movable head 203 due to the magnetic connection inside the rotary transformer 219.

The video signal input on/off circuit 250 placed between the recording signal processing circuit 249 and the rotary transformer 219 connects/disconnects the supply of the video signal b to the movable head 203, following the timing signal g described below. Therefore, the video signal is recorded during the period where the level of the timing signal g, which functions as the video signal on/off signal, is high. In FIG. 19, the tracks recorded by the movable head 203 are labeled B1, B2, . . . , and called B tracks.

The rotary transformer 219, on the other hand, supplies the signal obtained by the movable head 203 to a reproduction audio signal extraction circuit 251. The reproduction audio signal extraction circuit 251 extracts a reproduction audio signal from the reproduction signal from the movable head 203 according to timing signal h. In other words, the timing signal h functions as the reproduction audio signal extraction signal. The timing signal h is high, while deep layer recording of voices of B track is performed by a circuit of the voice recording system (not shown in the figure) and at the same time the surface layer recording of the pictures by the circuit in FIG. 18 is not performed (See FIG. 19). Therefore, the reproduction audio signal extraction circuit 251 extracts reproduction audio signals during the period where there is only deep layer recording when timing signal h is high.

The reproduction audio signal extraction circuit 251 supplies the extracted reproduction audio signal to a peak detection/integration circuit that detects the peak and integrates the reproduction audio signal and generates an integration signal, which is supplied to a audio track center position detector 253.

The audio track center position detector 253 detects the center of the audio trace (the part where the voices are recorded in the deep layer) based on the level change of the integration signal. The detected center position is supplied to a movable head positioning signal generator 254, which generates a positioning signal in order to move the movable head 203 to the detected center position. The positioning signal is supplied to the movable head unit 212 and causes the necessary movement of the movable head 203.

In this embodiment, a timing signal generation circuit 255 generates timing signals g and h based on the timing corresponding to a head switching signal c. The head switching signal c specifies the current head to be used for recording/reproduction, and switches as the rotating drum 207 rotates 180 degrees with the level changing from high to low and vice versa. In FIG. 19, within the periods where the head switching signal c is high, the head for A track (A1, A2 . . . ) is activated, while the head for B track is activated within the periods where the head switching signal c is low.

As described above, the timing signal g is supplied to the video signal input on/off circuit 250 and controls the connection/separation of the video signal b by the video signal input on/off circuit 250. The timing signal h is supplied to the reproduction audio signal extraction circuit 251, audio track center position detector 253, and a scanning signal generation circuit 256. The reproduction audio signal extraction circuit 251 extracts the reproduction audio signal according to the timing signal h. The scanning signal generation circuit 256 supplies a scanning signal to the movable head unit 212 in order to drive the movable head 203. As shown in FIG. 19, the scanning signal can be high only within the period when the timing signal h is high. According to this signal, the position of the movable head 203 embedded in the movable head unit 212 is examined.

Figure 20:
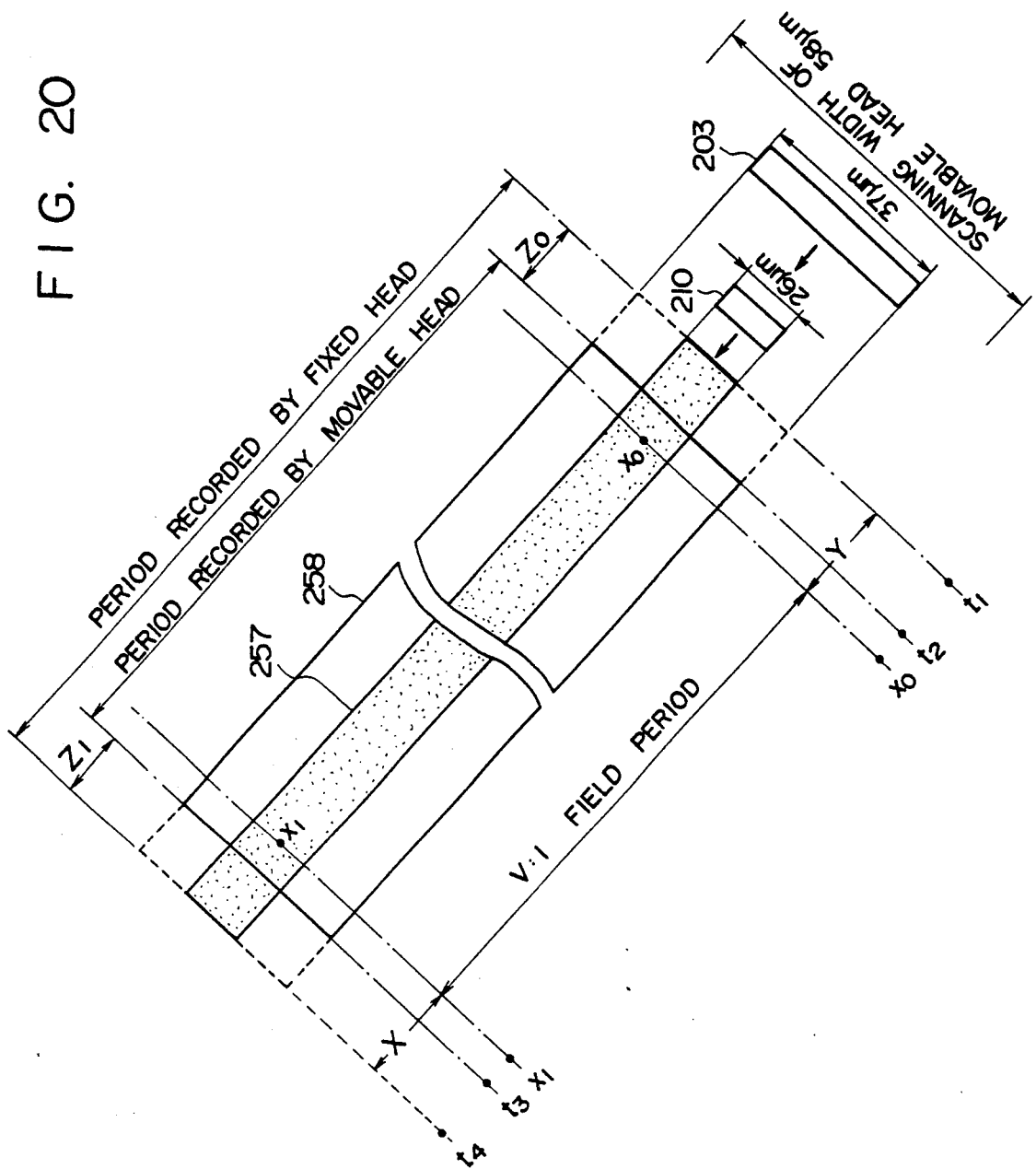
FIG. 20 shows the track structure when information is recorded with the timing chart shown in FIG. 19.
Figure 21:
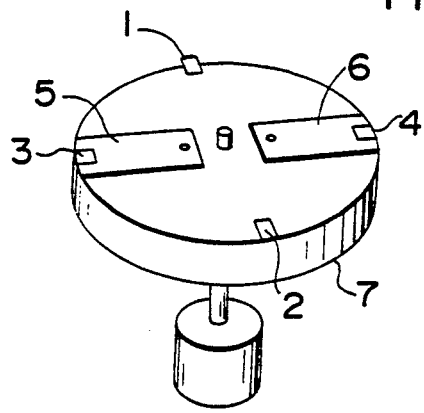
FIG. 21 is a perspective illustration of head position used in the first conventional embodiment.
Figure 22:
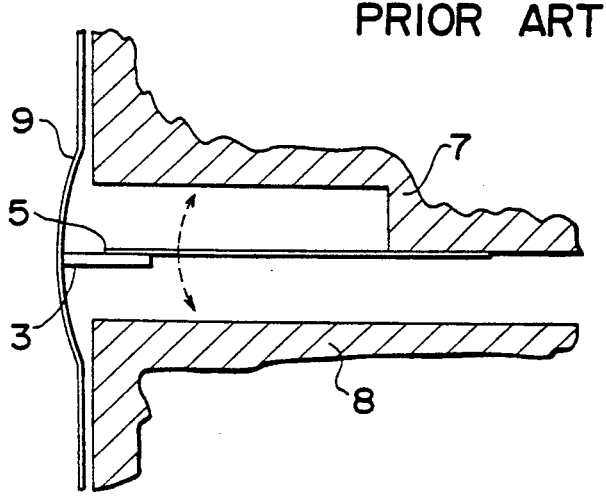
FIG. 22 is a cross-sectional view that describes actions of the movable head.
Figure 23:
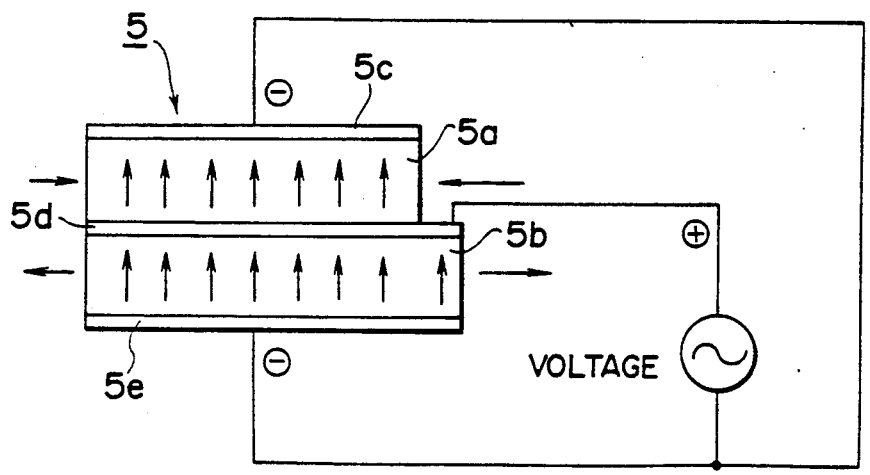
FIG. 23 shows the principle of the movement of a bimorph type piezoelectric element that drives the movable head.
Figure 24:
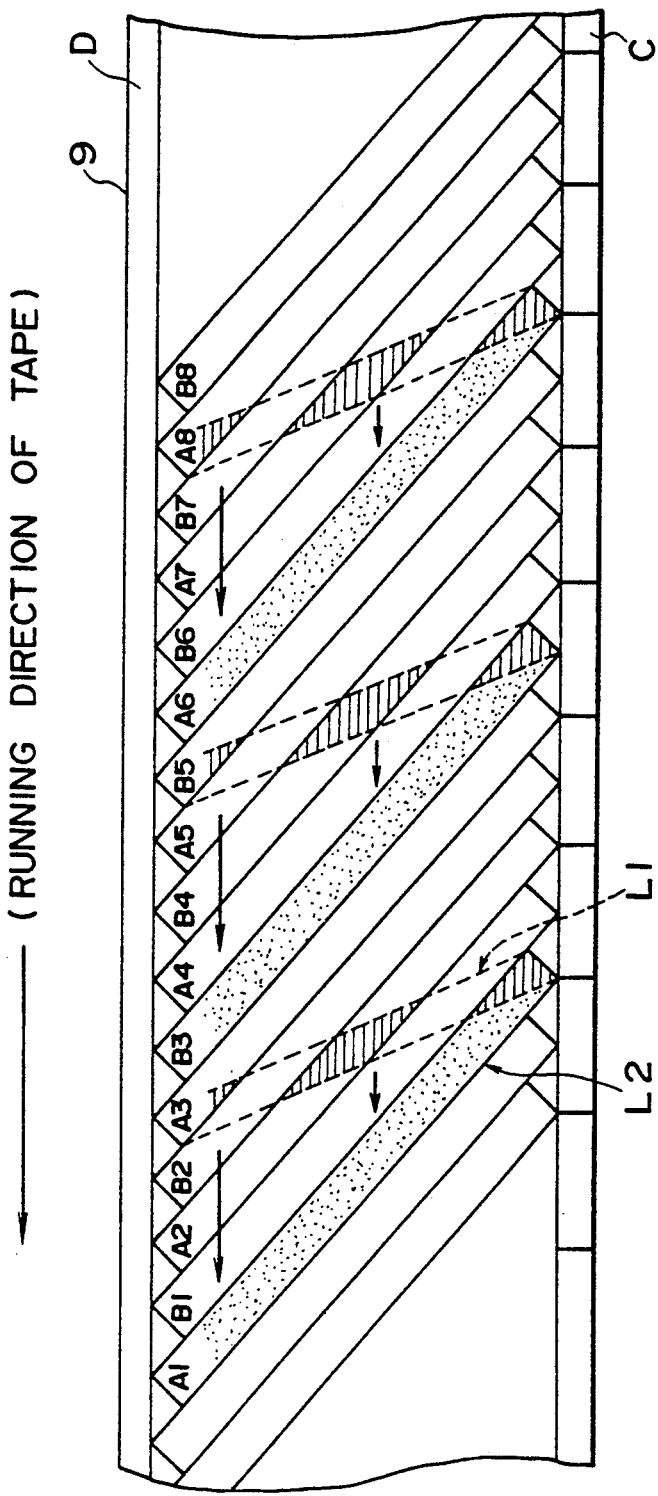
FIG. 24 shows the track pattern obtained by the first conventional embodiment.
Figure 25:
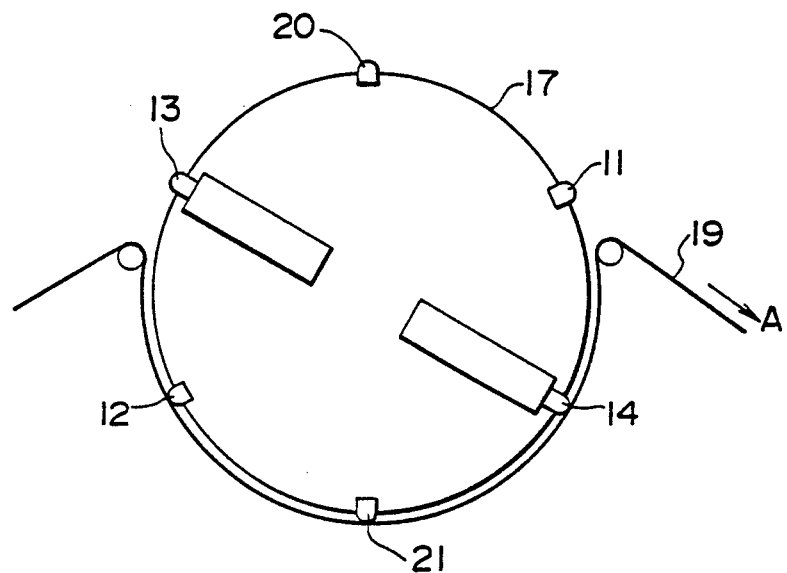
FIG. 25 is a plain view that shows the head position in the second conventional embodiment, where a pair of movable heads and two pairs of fixed heads are shown.
Figure 26:
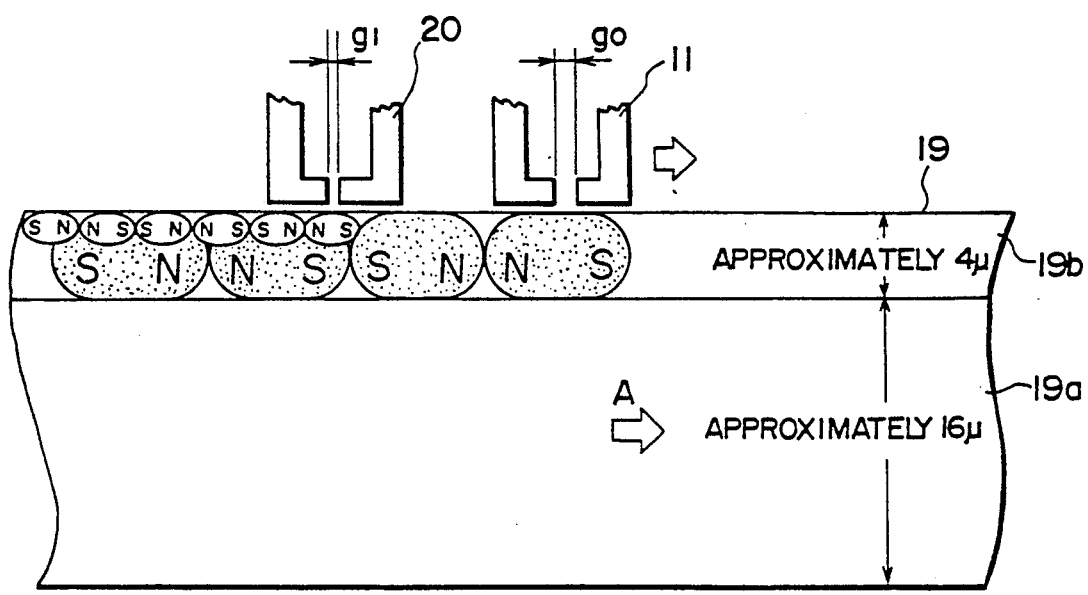
FIG. 26 shows the principle of two-layered recording.

FIG. 20 shows the timing of the recording by the fixed heads and the movable heads, where only one of the tracks formed on the magnetic tape 209 is distinguished. In the following explanation only the fixed head 210 and the movable head 203 will be used.

In this embodiment, the deep layer recording of voices on an audio track 257 is performed by the fixed head 210 having the width of 25 microns, and the surface recording of pictures on a video track 258 is performed by the movable head 203 having the width of 37 microns.

The recording period t1 to t4 on the audio track 257 is equal to the period when the magnetic tape 209 is rolled round the rotating drum 207 and equal to 190 degrees as shown in FIG. 19. The recording period t2 through t3 on the video track is 184 degrees. Therefore the length of the audio track 257 is longer than the length of the video track 258. The difference is indicated by Z0 and Z1, which are formed in this order. The length of Z0 and Z1 can be calculated by the following formula:

(circumference of the rotating drum)*(angle corresponding to Z0 or Z1)/(360 degree*1 H distance)

When the present embodiment is applied to VHS type VTR, the diameter of the rotating drum is 62 mm and the 1 H distance is 0.370 mm. Therefore, if the length of Z0 and Z1 is set to be equal, the length will be:

$$62pi*3/(360*0.370)mm \approx 4.4 H$$

The recording period t2 through t3 on a video track is longer than a field period of a video signal, because one field period of a video signal corresponds the 180 degrees. In FIG. 20, a field period is indicated by V and the part that corresponds to the difference of the audio track 257 and the field period V is indicated by Y and X, which are formed in this order. The points indicated by x0 and x1 are the starting point and the ending point of the field period V. The points x0 and x1 correspond to the high/low change (head switching) of the head switching signal c, and the points x0 and x1 are called switching points.

The term track without any modifier used in the above description means the area determined by the track length of the audio track 257 and the width of the movable head (they are surrounded by dotted lines in FIG. 20).

The timing signal g enables the recording where the length of the video track 258 is longer than the length of the audio track 257. In other words, by controlling the video signal input on/off circuit, the start of the video recording is delayed by Z0 from the start of the audio recording, and the end of the video recording is hastened by Z1 from the end of the audio recording, with respect to a fixed track.

The position control of the movable head is realized by the positioning signal generated by the movable head positioning the positioning signal generated by the movable head positioning signal generator 254. In this embodiment, video recording is realized by the movable heads 203 and 204, and after detecting the position of the audio track recorded by the fixed heads 210 and 211, the movable heads 203 and 204 are moved to the detected position in order to reproduce the recorded audio track described in FIG. 20. The positioning signal is used for setting of the movable heads 203 and 204 to the designated position (difference in level=16 microns) as well as the movement or positioning. The amount of the movement necessary for the positioning is supplied by the scanning signal.

With respect to the position control of the movable head, the scanning signal generation circuit 256 generates a scanning signal to detect the necessary amount of the movement. For example, the scanning signal generation circuit 256 uses the period within which only the fixed heads 210 and 211 are recording (t1 through t2, t3 through t4 ... ), and generates a scanning signal within these periods. The period used is, for example, 1 second from the beginning of the recording. The scanning signal generation circuit 256, generating a scanning signal, makes the movable heads 203 and 204 reproduce the audio signals recorded on the area indicated by Z0 and Z1.

The audio signals obtained by the movable heads 203 and 204 within the scanning signal generation period are supplied sequentially to the reproduction audio signal extraction circuit 251, the peak detection/integration circuit 252, the audio track center position detector 253, and the movable head positioning signal generator 254.

As described before, the signal generated by the peak detection/integration circuit 252 is an integration signal obtained by peak detection and integration of the reproduction audio signal. The level of the integration signal indicates the difference of the scanning position of the movable head 203 or 204 from the center of the audio track.

This is because the signals recorded on the audio track are FM signals. The level of an FM signal is constant and thus if the scanning position of a movable head 203 or 204 is covering the audio track, the level of the extracted audio signal is constant. The level decreases when the movable head 203 or 204 comes off the audio track. The amount of the decrease in level reflects the amount of the distance. Therefore, the relative position of the movable head 203 or 204 can be determined with the integration signal. The audio track center position detector 253 determines the position based on the integration signal.

In detail, the audio track center position detector 253 detects the decrease in level of the integration signal and with the level calculates the center position of the audio track relative to the current position of the movable head 203 or 204. The movable head 203 or 204 is supposed to be positioned within a circle having diameter of 58 microns. As shown in FIG. 20, the area almost covers the area formed by two center positions of neighboring video tracks.

The audio track center position detector 253 supplies the center position as a position signal to the movable head positioning signal generator 254. The movable head positioning signal generator 254 generates positioning signal according to the position signal. The positioning signal designates, for example, the position of the movable head 204 and corresponds to the driving voltage of the movable head 203. The generation of the positioning signal is performed within a second period after the generation of the scanning signal.

By repeating the above actions, two-layered recording of voices and pictures are performed as shown in FIG. 20.

With this embodiment, two-layered recording is realized with simpler structure than conventional instruments; for example, the two additional fixed heads used in the second conventional embodiment are not necessary. With this embodiment, simplification of the instrument structure, price decrease, as well as suppression of jitters in reproduction signals caused by repeated head hammering are realized.

The reproduction can be performed almost in the same manner as the recording. The reproduction of voices at normal speed is the same as the second conventional embodiment, and the normal video reproduction is performed by the position control of the movable heads 203 and 204 in the same manner as at recording. Special reproduction including speedy searching, slow searching and the like are performed by driving the movable heads 203 and 204 in the same manner as in the second conventional embodiment.

In this embodiment, the movable head units 212 and 213 are also voice coil type, which is the case in the first embodiment. As a result, at recording/reproduction, the movable heads 203 and 204 are moved with a good degree of parallelization. The possible amount of the movement is several hundred microns and the movable heads 203 and 204 can be driven by external signals with good responsiveness, which is suitable for realizing, for example, five time speedy scanning.

The position control of the movable heads 203 and 204 at reproduction can be different from the one based on the same level of the reproduction signal as the level at recording. level of the reproduction signal as the level at recording. For example, the method described in Japanese Patent Laid Open No. Hei 1-282769, in which the reproduction video signal obtained by the movable heads are envelope detected and controls the movable heads are controlled so that the obtained envelope detection signal is always at the maximum level, can be adopted.

In this embodiment, an audio signal is extracted in both of the intervals Z0 and Z1, but one of the two can be omitted.

The signal recorded in the deep layer is not restricted to an audio signal and the signal recorded in the surface layer is not restricted to a video signal. For example, digital signals such as a character signal and a PCM signal can be recorded. In order to apply the technique described in the present invention, however, the signal must be an FM signal with a constant amplitude.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rotating magnetic head unit for a magnetic recording reproduction system comprising:
    rotating drum means rotating at a designated speed, the magnetic tape being transported in contact around a periphery of said rotating drum means, an axis of rotation of said rotating drum means having a designated angle with respect to a width direction of the magnetic tape;
    movable head means, mounted to project radially from the periphery of said rotating drum means to contact the magnetic tape, for recording and reproducing signals on the magnetic tape, said movable head means being movably supported along the axis of rotation of said rotating drum means;
    fixed head means, mounted to project radially from the periphery of said rotating drum means to contact the magnetic tape, for recording and reproducing signals on the magnetic tape, said fixed head means being mounted relative to said movable head means a designated angle around the periphery of said rotating drum means;
    head position detector means for detecting a position of said movable head means along the axis of rotation of said rotating drum means;
    head position controller means, coupled to said head position detector means, for generating a control signal indicative of a difference between the detected position and a designated standard position of said movable head means during normal recording; and
    head driver means, operatively coupled to said movable head means, for driving said movable head means along the axis of rotation of said rotating drum means to the designated standard position, in accordance with the control signal.

2. The rotating magnetic head unit according to claim 1, wherein said head position detector means comprises:
    reproducer means for reproducing the signals recorded by said fixed head means, using said movable head means; and
    track position servo means for detecting a center position of a track recorded by said fixed head means, based on the signals reproduced by said reproducer means,
    said head position controller means comprising head positioning means for generating the control signal according to the center position detected by said track position servo means.

3. The rotating magnetic head unit according to claim 2, wherein said track position servo means comprises:
    reproduction signal extraction means for extracting reproduction signals containing constant level signals from the signals reproduced by said reproducer means;
    level detector means for detecting a level of the reproduction signal extracted by said reproduction signal extraction means; and
    track center position detector means for detecting a difference of the level detected by said level detector means and the level of the reproduction signal when the center position of the track recorded by said fixed head means and the track scanned by said movable head means agrees and for generating a difference between said fixed head means and said movable head means along the axis of rotation of said rotating drum means.

4. The rotating magnetic head unit according to claim 2, wherein said head position controller means further comprises:
    record on/off means for enabling said movable head means to record within a period when said fixed head means records; and
    center position detection control means for directing said track position servo means to detect the center position of the track recorded by said fixed head means, while said movable head means is not recording and said fixed head means is recording.

5. The rotating magnetic head unit according to claim 4, wherein said center position detection control means comprises scanning signal generation means for directing said head driver means to drive said movable head means in accordance with the control signal, while said movable head means is not recording and said fixed head means is recording.

6. The rotating magnetic head unit according to claim 1, wherein said movable head means is a video head for reproducing video signals.

7. The rotating magnetic head unit according to claim 1, wherein said fixed head means is an audio head for recording and reproducing voice signals.

8. The rotating magnetic head unit according to claim 6, wherein said fixed head means is an audio head for recording and reproducing voice signals.

9. The rotating magnetic head unit according to claim 8, wherein said head position controller means comprises:
    record on/off means for enabling said movable head means to record within a period when said fixed head means records; and
    center position detection means for detecting a center position of the track recorded by said fixed head means, while said movable head means is not recording and said fixed head means is recording, said center position detection means including scanning signal generation means for directing said head driver means to drive said movable head means in accordance with the control signal, while said movable head means is not recording and said fixed head means is recording,
    said head driver means includes movable head supporter means and actuator means, said actuator means comprising
        a plurality of circular springs positioned parallel to and along the axis of rotation of said rotating drum means, each of said circular springs having a designated elasticity in a direction of the axis of rotation of said rotating drum means and a hole near its center,
        bobbin means movably supported within the holes of said circular springs so that an axis of said bobbin means is parallel to the axis of rotation of said rotating drum means,
        coil means wound around said bobbin means, a current corresponding to the control signal generated by said head position controller means driving said coil means to generate a magnetic field inside said actuator means, and permanent magnet means for supplying a constant magnetic field inside said actuator means, the constant magnetic field repulsing the magnetic field generated by said coil means to provide movement of said bobbin means along the axis of rotation of said rotating drum means an amount corresponding to a magnitude of the magnetic field generated by said coil means, said movable head supporter means being a projection of one of said circular springs, the movable head means being supported on an endpoint of said movable head supporter means.

10. The rotating magnetic head unit according to claim 1, wherein said head driver means comprises:

actuator means for moving said movable head means, according to the control signal generated by said head position controller means, along the axis of rotation of said rotating drum means; and movable head supporter means, having first and second endpoints, said first endpoint being operatively coupled to said actuator means, said movable head means being mounted upon said second endpoint.

11. The rotating magnetic head unit according to claim 10, wherein said actuator means comprises:

a plurality of circular springs positioned parallel to and along the axis of rotation of said rotating drum means, each of said circular springs having a designated elasticity in a direction of the axis of rotation of said rotating drum means and having a hole near its center;

bobbin means movably supported within the holes of said circular springs so that an axis of said bobbin means is parallel to the axis of rotation of said rotating drum means;

coil means wound around said bobbin means, a current corresponding to the control signal generated by said head position controller means driving said coil means to generate a magnetic field inside said actuator means; and permanent magnet means for supplying a constant magnetic field inside said actuator means, the constant magnetic field repulsing the magnetic field generated by said coil means to provide movement of said bobbin means along the axis of rotation of said rotating drum means an amount corresponding to a magnitude of the magnetic field generated by said coil means, said movable head supporter means being a projection of one of said circular springs.

12. A rotating magnetic head unit, for use in a magnetic recording/reproducing apparatus, comprising:

rotating drum means rotating at a designated speed, magnetic tape being transported in contact around a periphery of said rotating drum means, an axis of rotation of said rotating drum means having a designated angle with respect to a width direction of the magnetic tape;

movable head means, mounted to project radially from the periphery of said rotating drum means to contact the magnetic tape, for recording and reproducing signals on the magnetic tape, said movable head means being movably supported along the axis of rotation of said rotating drum means;

non-contact head position detection means, mounted upon a frame member of the magnetic recording/reproducing apparatus parallel to a contact area of said rotating drum means and the magnetic tape, for detecting a position of said movable head means along the axis of rotation of said rotating drum means;

head position control means, coupled to said head position detection means, for generating a control signal indicative of a difference between the detected position and a designated standard position of said movable head means during normal recording; and head driver means, operatively coupled to said movable head means, for driving said movable head means along the axis of rotation of said rotating drum means to the designated standard position, in accordance with the control signal.

13. A rotating magnetic head unit, for use in a magnetic recording/reproducing apparatus, comprising:

rotating drum means rotating at a designated speed, magnetic tape being transported in contact around a periphery of said rotating drum means, an axis of rotation of said rotating drum means having a designated angle with respect to a width direction of the magnetic tape;

at least one pair of movable head means for recording and reproducing signals on the magnetic tape, said movable head means of said at least one pair of movable head means being mounted in axial symmetric positions with respect to the axis of rotation of said rotating drum means and being movably supported along the axis of rotation of said rotating drum means;

a designated number of non-contact head position detecting means, mounted upon a frame member of the magnetic recording/reproducing apparatus parallel to a contact area of said rotating drum means and the magnetic tape, for detecting positions of said movable head means along the axis of rotation of said rotating drum means;

head position control means, operatively coupled to said plurality of head position detecting means, for generating control signals indicative of differences between the detected positions and designated standard positions of said movable head means during normal recording; and at least one pair of movable head drivers, of number equal to said at least one pair of movable head means, for driving said movable head means along the axis of rotation of said rotating drum means to the designated standard positions, in accordance with the control signals.

14. The rotating magnetic head unit according to claim 13, wherein said plurality of head position detecting means each comprise:

light emitter means for emitting light along the contact area of said rotating drum means and the magnetic tape;

light receptor means for receiving the emitted light reflected by a corresponding one of said movable head means; and calculator means for calculating the detected positions of said movable head means along the axis of rotation of said rotating drum means, based on the received reflected light.

15. The rotating magnetic head unit according to claim 14, wherein said light emitter means comprises:

an emission element for generating a light beam of a designated beam form; and an objective lens for directing the generated light beam to a corresponding one of said movable head means as the emitted light, a focus of said objective lens corresponding to a respective one of the designated standard positions, said light receptor means comprises light converging means for converging the reflected light; and a light reception element for receiving the reflected light converged by said light converging means, said light reception element having a predetermined number of light reception parts which generate a voltage that corresponds to a received amount of the reflected light.

16. The rotating magnetic head unit according to claim 15, wherein said calculator means comprises:

matrix connections, coupled among said light reception parts and functioning as output terminals, for converting output voltages of each of said light reception parts into signal voltages; and calculation element means, which receives the signal voltages from said matrix connections, for calculating a relative position of said movable head means from the focus of said objective lens and for supplying the relative position as said detected position to said head position controller means.

17. The rotating magnetic head unit according to claim 16, wherein said head position control means comprises:

switch means for supplying the output from said calculation element means to a corresponding one of said head driver means during recording; and track follower means, operable during reproduction, comprising track detect means for detecting a position of a track formed on the magnetic tape, head driving signal generation means for generating head driving signals during reproduction according to the detected track position, and head driving signal supply means for supplying the head driving signals to said switch means during reproduction, said switch means supplying the head driving signals to said head driver means during reproduction.

18. The rotating magnetic head unit according to claim 17, wherein each of said head driver means includes movable head supporter means and actuator means for moving a corresponding one of said movable head means, said actuator means comprising:

a plurality of circular springs positioned parallel to and along the axis of rotation of said rotating drum means, each of said circular springs having a designated elasticity in a direction of the axis of rotation of said rotating drum means and having a hole near its center;

bobbin means movable supported within the holes of said circular springs so that an axis of said bobbin means is parallel to the axis of rotation of said rotating drum means;

coil means wound around said bobbin means, a current corresponding to a corresponding one of the control signals generated by said head position controller means driving said coil means to generate a magnetic field inside said actuator means; and permanent magnet means for supplying a constant magnetic field inside said actuator means, the constant magnetic field repulsing the magnetic field generated by said coil means to provide movement of said bobbin means along the axis of rotation of said rotating drum means an amount corresponding to a magnitude of the magnetic field generated by said coil means, said movable head supporter means being a projection of one of said circular springs, the corresponding one of said movable head means being supported on an endpoint of said movable head supporter means.

19. The rotating magnetic head unit according to claim 13, wherein each of said head driver means comprise:

actuator means for moving a corresponding one of said movable head means, according to a corresponding one of the control signals generated by said head position control means, along the axis of rotation of said rotating drum means; and movable head supporter means, having first and second endpoints, said first endpoint being operatively coupled to said actuator means, the corresponding one of said movable head means being mounted upon said second endpoint.

20. The rotating magnetic head unit according to claim 19, wherein said actuator means comprises:

a plurality of circular springs positioned parallel to and along the axis of rotation of said rotating drum means, each of said circular springs having a designated elasticity in a direction of the axis of rotation of said rotating drum means and having a hole near its center;

bobbin means movably supported within the holes of said circular springs so that an axis of said bobbin means is parallel to the axis of rotation of said rotating drum means;

coil means wound around said bobbin means, a current corresponding to a corresponding one of the control signals generated by said head position controller means driving said coil means to generate a magnetic field inside said actuator means; and permanent magnet means for supplying a constant magnetic field inside said actuator means, the constant magnetic field repulsing the magnetic field generated by said coil means to provide movement of said bobbin means along the axis of rotation of said rotating drum means an amount corresponding to a magnitude of the magnetic field generated by said coil means, said movable head supporter means being a projection of one of said circular springs.

* * * * *